US008533137B2

(12) United States Patent
Turbin et al.

(10) Patent No.: US 8,533,137 B2
(45) Date of Patent: Sep. 10, 2013

(54) POSITION RESOLVED MEASUREMENT APPARATUS AND A METHOD FOR ACQUIRING SPACE COORDINATES OF A QUANTUM BEAM INCIDENT THEREON

(75) Inventors: Evgeny Turbin, Moscow (RU); Yury Prokazov, Magdeburg (DE)

(73) Assignees: Leibniz-Institut fuer Neurobiologie, Magdeburg (DE); Europhoton GmbH, Gesellschaft fuer Optische, Berlin (DE)

( * ) Notice: Subject to any disclaimer, the term of this patent is extended or adjusted under 35 U.S.C. 154(b) by 256 days.

(21) Appl. No.: 13/140,319

(22) PCT Filed: Dec. 18, 2009

(86) PCT No.: PCT/EP2009/067564
§ 371 (c)(1),
(2), (4) Date: Jul. 27, 2011

(87) PCT Pub. No.: WO2010/070113
PCT Pub. Date: Jun. 24, 2010

(65) Prior Publication Data
US 2011/0276526 A1   Nov. 10, 2011

(30) Foreign Application Priority Data
Dec. 19, 2008  (EP) ................................. 08172354

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC .......................................................... 706/17

(58) Field of Classification Search
None
See application file for complete search history.

(56) References Cited

U.S. PATENT DOCUMENTS

| 5,331,161 A | * | 7/1994 | Ohdomari et al. .............. 850/63 |
| 5,783,829 A | | 7/1998 | Sealock |
| 5,965,895 A | * | 10/1999 | Satoh et al. ................ 250/491.1 |
| 5,999,638 A | * | 12/1999 | Takeo et al. ................... 382/132 |

FOREIGN PATENT DOCUMENTS
WO   98/19179 A1   5/1998

OTHER PUBLICATIONS

Alderighi et al. "Morphological Classification of CCO Frames in a Photon Counting Intensified CCO", IIM, 1997, pp. 118-123.*
Wedrowski "Artificial neural network based position estimation in positron emission tomography", 2010, http://www.iihe.ac.be/publications/MWedrowski_PhD_thesis.pdf.*
International of Search Report Dated Jun. 24, 2010.
M. Alderighi et al., "Morphological Classification of CCD Frames in a Photon Counting Intensified CCD", IEEE Instrumentation and Measurement Technology Conference Ottawa, Canada, p. 118-123, May 19-21, 1997.

* cited by examiner

*Primary Examiner* — Li-Wu Chang
(74) *Attorney, Agent, or Firm* — Norris McLaughlin & Marcus P.A.

(57) ABSTRACT

The position calculation of prior art position sensitive detector systems relies on a known geometry pattern of individual electrodes and the distribution of the charge parts. A heuristic estimation is made in order to calculate an initial coordinate of irradiation. In contrast, the present invention allows one to calculate the position of an incident particle in terms of direct mapping of the measured detector response into position coordinates detector surface. The device for estimating the space coordinates of an irradiation position onto a detector comprises a position sensitive detector; an irradiation source; means for measuring the response of detector generated upon irradiation by irradiation source; and an artificial neural network structure provided such that the measured detector response is the input to the artificial neural network structure and the initial space coordinates of irradiation are the output of the artificial neural network structure.

20 Claims, 20 Drawing Sheets

POSITION RESOLVED MEASUREMENT APPARATUS AND A METHOD FOR ACQUIRING SPACE COORDINATES OF A QUANTUM BEAM INCIDENT THEREON

This application is a 371 application of PCT/EP2009/067564 filed Dec. 18, 2009, which claims foreign priority benefit under 35 U.S.C. §119 of European application 08172354.6 filed Dec. 19, 2008.

The present invention relates to a position resolved measurement apparatus and a method for acquiring position information of an irradiation position of a quantum beam incident thereon, in particular, incident on a position sensitive detector based on an electron multiplication principle with space sensitive readout capability.

BACKGROUND OF THE INVENTION

Position sensitive detectors are used to measure spatial coordinates of incident particles thereon. Such particles can be, e.g. photons, electrons, neutrons, ions, x-rays etc. Such detectors are used to detect the particles and their position on a sensitive area of the detector. However, in order to detect individual particles, the signal resulting from that detector needs to be amplified, which may be done, e.g., by an electron multiplier arranged inside the detector. The amplification leads to a formation of an avalanche of electrons inside the detector resulting in a cloud of electrons inside the detector. From this measured cloud, the initial position of the particle incident on the detector needs to be calculated.

An electron multiplier may be formed by a micro-channel plate (MCP), which is an array consisting of $10^4$-$10^7$ tiny channels. Each individual channel acts like a miniature electron amplifier. The technology of MCP production has been developed for the last forty years. Originally, they were developed as X-Ray detectors or ion sensors for the needs of nuclear physics experiments. The channel diameter has been improved starting from 100 µm in the 1960s to modern plates having a pore diameter of 3.2 µm. The pore or channel size and the pore-to-pore distance limit a maximal spatial resolution of the detector.

A maximal gain factor of the single MCP channel could reach up to $10^3$-$10^4$. Such a small number of electrons can neither be easily detected nor precisely measured utilizing the current electronic components. Usually, assemblies or stacks of MCPs are used, for instance: two (chevron), three (Z-stack) or multi MCP assembly. An example of such detector is shown in FIG. 1 comprising two MCP stacked on top of each other forming a single stack. Particles are incident on a photocathode 3 of a detector 1. The photocathode 3 converts the initial particle into a photoelectron by the photoelectric effect. The photoelectron is then amplified through the generation and multiplication of secondary electrons while passing through the MCPs 4. When a quantum, e.g. a photoelectron in the present embodiment, to which the MCP is sensitive is incident on the inner wall of one channel, at least one electron is emitted from the inner wall. The electron emitted from the inner wall of the channel is then accelerated by an electric filed generated by a voltage applied to both ends of the MCP, and travels to collide again with the channel wall to generate a secondary electron. This process is repeated many times along each channel, so as to multiply and accelerate the electrons, such that a large number of electrons are emitted from the output face of the MCP. The two-dimensional position of the electrons is maintained by these channels. The resulting electron avalanche is finally detected on a position sensitive anode 2 of detector 1. The charge on different electrodes of the anode 2 is read-out by a read-out circuit. Each electrode produces a signal corresponding to the detection position of the initial particle.

A strong impulse for further MCP development was given by development achievements on night vision detectors. A typical night vision device combines a photocathode in front of the MCP assembly and a phosphor screen at the output. An incident photon hits out the photoelectron from the surface of the photocathode and gets amplified inside the MCP stack. A resulting electron cloud is focussed applying an electric field in the interval between the last MCP and the screen to a small point on the surface of a phosphor layer inducing a light flash intensive enough to be visible by an eye or measured by a charge coupled device (CCD) based detector. Depending on the material of the screen, the light flash decay time may vary in range of 1-50 µs. As a result, the system produces a durable flash of light at the output even for a single incident photon. This type of light detection belongs to the integrating measurement class; while it is sensitive enough to register individual quanta of light, the method does not distinguish single photons due to the long-life decay times of the resulting flashes.

In contrast, a single particle counting detector allows registering an individual event in order to acquire additional parameters along with the spatial coordinates of an incident particle. A typical counting device comprises an MCP stack and an anode system. The cathode is an optional part to convert low-energy photons into electrons. An incident particle interacting with the front surface of MCP results in an avalanche of electrons. The resulting electron cloud, following an applied electrical field, falls onto the anode, where it is detected.

A number of well-known anode systems are commonly used for various applications like single photon counting, nuclear physics experiments etc.

In general, space sensitive anodes can be separated into two domains of the space coordinate measurement principle: time and charge (current) based. The simplest example for a time-based anode is a one-dimension delay-line arrangement, in which the coordinate is measured by use of a time difference between arrival of the signal to the ends of the line. There is also a number of known charge division based anode system configurations: wedge-strip, quadrant, Vernier, resistive layer, to mention some examples.

It is clear that greater amplification factors can easily be achieved by stacking more and more MCPs on top of each other. Higher amplification will result in a better signal-to-noise ratio (SNR) and finally cause a higher spatial resolution. However, using stacks of three and more MCPs will result in a shorter lifetime of the detector due to the limited resource of the MCP (amplification degradation). Most of the delay line detectors (time domain anodes) require three or more MCPs for proper operation.

All the time based measurement methods are based on the same approach: they measure the time difference between the pulses acquired from the ends of various configurations of delay lines. Delay line based systems are widely used in nuclear physics experiments. In delay line detectors, the avalanche from the MCP stack crosses a meander-like delay line. The charge pulse induces an electric pulse on the wires of the delay line, which propagates to the two ends of the wires. Electronic time-to-digital or time-to-amplitude converters measure the difference of the arrival time of the signal at each end. The measured time difference of arrival is proportional to the respective position of the charge cloud in the direction of arrangement of the delay line, i.e. a delay line with respect to the lateral x-coordinate or a delay line with respect to the lateral y-coordinate. The delay line may be employed in single particle counting measurements.

Charge division based anodes belong to a large family of anode systems employing the principle of dividing the electron cloud charge into smaller parts. The anode comprises a planar or complex surface that can be a combination of the planar, cylindrical, cone or spherical surface parts. The surface is covered by a set of electrode elements electrically isolated from each other or combined in order to form a position sensitive pattern. A volume of an electric charge carried by the electron cloud induced by an incident particle is shared between the electrode elements.

Lampton et al, "Quadrant Anode Image Sensor", RSI, Vol. 47, No. 11, November 1976, p. 1360 discloses a quadrant anode (QA) based image sensor as shown in FIG. 2. The anode is a metal plate divided into four electrically isolated quadrants. The quadrants are equally large. The total charge of the electron cloud is divided into four parts: left top $q_{lt}$, right top $q_{rt}$, left bottom $q_{lb}$ and right bottom $q_{rb}$. Each charge value is measured. In order to estimate the initial position of the incident particle onto the detector, the difference between the sums of the charges that fell above and below the horizontal line of division of the electrodes being normalized to the value of the total charge may define the y coordinate of the incident particle. The horizontal coordinate x is calculated the same manner using left and right charge parts:

$$x=(q_{rt}+q_{rb}-q_{lt}-q_{lb})/q_\Sigma,$$

$$y=(q_{rt}+q_{lt}-q_{lb}-q_{rb})/q_\Sigma,$$

where $q_\Sigma=q_{rt}+q_{rb}+q_{lt}+q_{lb}$, i.e. the whole measured charge.

The method presented by Lampton achieves high spatial resolution down to a diameter of a single MCP channel. A short length of the inter-electrode border results in a low inter-electrode capacity that allowed a very precise charge measurement, since a strong dependence of noise of the charge sensitive amplifiers exists with respect to the input capacity. The ratio between the perimeter length to the area is low, i.e. the capacitance induced noise component will be low. The above equations result in a simple computation algorithm for the position sensitive anode being based on the principle of charge division. While the spatial resolution is high, the working area of the approach proposed by Lampton is limited to several millimetres in diameter with respect to the centre point of the quadrants. This is because the calculation method shown above results in high non-linearity outside the centre of the structure. Furthermore, it is important to notice that the method does not take into account the factor of an angular non-symmetry of the avalanche induced by the angle of the MCP channel.

In U.S. Pat. No. 4,395,636 A, a wedge-strip anode (WSA) based image sensor is disclosed. Such a structure is shown in FIG. 3. The WSA comprises a position sensitive anode 2 in the form of periodically arranged sets of interconnected anode regions, which comprise wedge and strip regions, for detecting the position of the centroid of a charge cloud arriving thereat from a charge multiplier. Each of the wedges has the same geometry and comprises a charge collection area, which varies linearly from bottom to top of the anode. A WSA employs a planar electrode pattern designed to overcome non-linearity problems described by Lampton for the QA. Due to the complex shape of the electrodes, the border becomes long. This results in a 20-30 times increased capacity in comparison to the quadrant inter-electrode capacity and, as a consequence, requires higher MCP amplification to achieve the same signal-to-noise ratio as in simpler structures. The position calculation is done by taking a linear combination of the individual charges related to the total charge. The computation method relies on a geometrical pattern of the avalanche and the assumption of a certain charge footprint.

In later work by M. Purschkea et al ("An improved quadrant anode image sensor with microchannel plates", 1987, Nuclear Instruments and Methods in Physics Research), an advanced method for calculating the position of the centre of the electron avalanche is described. Purschkea employs a polynomial interpolation of the charge ratios used by Lampton. This is done in order to enlarge the area of linearity of a quadrant anode. To do so, it is necessary to enlarge an efficient size of the cloud footprint. In order to compensate the losses of charge on the edges of the MCPs and to collect all the charge carried by the cloud, the anode area needs to be enlarged. The combination of the larger anode area and the polynomial interpolation allowed utilizing up to 80% of the MCP area for the measurement.

J. S. Lapington et al ("Imaging achievements with the Vernier readout", 2002, Nuclear Instruments and Methods in Physics Research) discloses Vernier anode pattern based on a planar structure of repetitive sine wave shaped stripes. The position calculation algorithm is a linear combination of the measured charges.

In A. S. Tremsin et al ("Centroiding algorithms and spatial resolution of photon counting detectors with cross-strip anodes", Nuclear Science Symposium Conference Record, Volume 2, Issue, 2003) a combination of the avalanche footprint modelling and geometrical estimation is described. In order to compute the coordinate, Tremsin applies an estimator formula in order to find the position of the electron avalanche maximum. A large number of electrodes are used for every axis of a cross strip anode as shown in FIG. 4 in order to achieve appropriate spatial resolution. A simple average over the stripe signals is calculated to get the initial coordinate.

Further, U.S. Pat. No. 5,686,721 A discloses a charge imaging device and a method to separate a high vacuum volume of the electron amplifier from electrodes placed outside the vacuum. The major benefit of this method is a freedom to chose an anode pattern and easily change it on request. The approach is described, e.g., with respect to WSA and delay-line anode systems.

All methods and devices require a heuristic approximation for the calculation of spatial coordinates of the incident particle. A polynomial function of the measured detector responses may be used to approximate spatial coordinates as a function of the responses. The coefficients may be found from a least square equation. For example, in a charge-division based anode, the polynomial function may be a sum of products of charges, wherein the sum of the respective charge powers does not exceed a predefined integer N, the degree of the polynomial. For instance, a polynomial function for a position sensitive detector with an anode having five electrodes may be written as sum of terms like $c_n * q_1^i * q_2^j * q_3^k * q_4^l * q_5^m$, where i+j+k+l+m is less or equal to N and $c_n$ is a coefficient of the n-th member of the polynomial. The number of summands is defined by the respective number of all possible and allowed combinations of non-negative numbers i, j, k, l, m. In order to approximate an unknown function of the detector responses, one has to build a polynomial having a degree high enough to precisely approximate the behaviour of the response function. However, higher degrees of polynomials suffer the problem of computational non-stability. Such non-stability is known from the prior art and affects the least square approximation procedure and the computation of the polynomial itself. These factors make it problematic and practically impossible to employ polynomials to approximate spatial coordinates as a function of the detector responses. Furthermore, increasing the number of anode outputs will result in a decrease of the final resolution due to the computational errors in the polynomial approximation, while generally a larger number of electrodes in case of charge-division based anode should result in a higher spatial resolution.

To conclude, the position calculation of different anode systems in prior art relies on a known geometry pattern of individual electrodes and the distribution of the charge parts. Heuristic estimations are then made in order to calculate the initial coordinate of incidence on the detector.

Yet, the response of a single MCP to an incident particle depending on its energy, its kind, its spatial position of the initial hit and the angle of fall relative to the pore or channel varies in a range from 0 to $10^4$ electrons. FIG. 5 shows the process of amplification in MCPs. The efficiency of the secondary electron emission strongly depends on a combination of the energy and the kind of initial particle. MCP's are known to be highly efficient to alpha particles and ions due to the high mass and charge. The probability to emit a number of secondary electrons as a reaction to a hit off an alpha particle is around 100%. Gamma-quanta and electrons may result in an avalanche, if and only if, the energy agrees with the sensitivity spectra of the MCP for an electron.

The trajectory of the initial particle results in a varying number of secondary electrons. If the particle does not hit the sensitive surface of the channel on a first third measured from the front face of the MCP, the event will most probably be lost. This effect has two major reasons. First, if the incident particle is required to hit out a sufficient number of electrons within the first interaction act, the length of the channel will limit the avalanche development. The second reason relies on the amplification of secondary electrons. These electrons to be multiplied shall have sufficient energy to hit out more than one electron per each electron-wall interaction act. In case that an initial hit took place close to the output of the MCP channel, the electrons most probably will not be accelerated to the energies required for secondary emission.

A spatial position relative to the pore or channel edge and energy of the incident particle may cause two chains of events. The first and simplest one is that a particle will not result in any secondary amplification and will be lost.

Gamma-quanta may result a local temperature increase, scattering or hitting out an electron that potentially could result in an avalanche. In case of charged particles, scattering and electron hitting-out is possible. If one or more secondary electrons are not generated, an initial particle will not result in an avalanche and, as a result, will not be registered by the detector.

The electron emitting reaction branches may cause several effects. Depending on penetration properties of an incident particle, the depth from the surface where the electrons are generated will differ. In case of deep penetration of the initial particle, the most probable scenario will be a reunification with an ion or an atom from which electrons have been hit out. The electrons that are born close to the surface or on the surface may be captured by the channel and, probably, result in an avalanche.

Summarising the above points, the conclusion is that electron multiplication, taking place inside the microchannel or micro-sphere plate pore, is a stochastic process. A final number of electrons carried by an avalanche, see FIG. 6, depends on the following factors: kind of particle, energy range, and type of MCP. Due to the complexity and multi-branching nature of the electron multiplication, a direct measurement should be performed in order to get the information about amplification properties of the MCP.

Due to the random number of electrons carried by the avalanche, the amplitude of the signal will differ for the same excitation position. In other words, the measured volume of charge will differ even if an incident particles initially interacting with the same channel of the front MCP of the stack as shown in FIG. 7. Every dot on the plot represents a single event induced by irradiating a small spatial area of the front MCP.

Horizontal and vertical coordinates are the values of the measured charges acquired from the first and the second electrodes of the quadrant anode (see FIG. 2).

The second effect relates to position sensitive anodes based on a charge division principle as one example of the possible number of different position sensitive detectors. Depending on the size of the electron cloud, the forces of the interaction inside will differ due to the difference in the electric field inside the plasma cloud. In other words, the shape of avalanche will differ depending on the number of electrons carried by the cloud.

In general, the behaviour of the electron cloud is a dynamic and complex process that depends on a large number of parameters.

The first is the amplification properties of an MCP. Depending on the material they are made of, the amplification may vary in a wide range. Individual channel diameter may also influence the shape of the resulting cloud and a maximal number of electrons that can be produced by a single amplification act.

The second parameter is the efficient shape of the avalanche. The word "efficient" refers to a footprint of the avalanche on the anode plate where most of the electrons are located. The diameter of the charge cloud can be varied by the applied voltage between the output of the last MCP in the stack and the anode. A higher voltage will accelerate the cloud thus minimizing its time of flight from the MCP to the anode. This results in a smaller avalanche footprint diameter due to the shorter time span in which internal forces inside the cloud are applied to the individual electrons carrying charge expanding the cloud.

The third parameter concerns the asymmetry of the whole cloud induced by the angle between a central axis of the individual channel and the plate of the anode. This factor also tightly connects to the voltage in the MCP-anode gap. Lower voltages will allow the cloud to spread more along the anode and an overall distribution will be smoother. In other words, the initial non-symmetry will be blurred along the anode area resulting in a more homogeneous distribution. In an extreme case of zero applied voltage, the cloud will explode by the internal electrical field and only small outer parts of the charge may reach the anode and cover it homogeneously.

Concluding the above points, it is difficult to find a static or heuristic model of the anode or electron avalanche described in the prior art.

In addition, along with position information, a time resolution of the detection is usually desired. Time and position resolved measurement apparatuses are known in the prior art for performing time-resolved measurements of light emission to acquire a position and time of the emission. Such apparatuses employ microchannel plates (MCP) to achieve amplification with ultra-fast response times for an incident particle. A microchannel plate is a planar structure consisting of millions of miniature tubes oriented parallel to each other. Every channel acts like a miniature electron multiplier. Typically, the plate is about a millimeter or less thick and the channel diameter varies in range of 3 to 10 microns in modern plates.

MCPs are known to be sensitive to electrons, charged particles and X-Ray irradiation. For single incident quanta of irradiation, a channel produces an avalanche of $10^3$-$10^4$ electrons. In order to increase an efficient number of the resulting electrons, i.e. achieve higher amplification, stacks of two, three or more plates are used. Typically, an electron avalanche is formed and fed out from the MCP in response to an incident quantum beam during pico- to nanoseconds. The time-jitter of the front edge of the pulse induced by the electron avalanche is known to take place on a picosecond time scale. While the avalanche leaves the MCP, a deficit of electrons appears. Therefore, a power supplier is provided to compensate the charge taken away by the avalanche. This pulse can be measured and analyzed.

US 2007/0263223 A1 discloses a time- and position-resolved measurement apparatus with MCP multiplication device and a position sensitive anode. The timing signal pulse is read from the output surface of the MCP stack. However, the measured signal changes its polarity during time. Such polarity change requires the use of zero crossing detection techniques in order to provide an accurate time measurement. The temporal resolution achieved by US 2007/0263223 A1 is about 60 ps.

SUMMARY OF THE INVENTION

It is therefore an object of the present invention to provide a position resolved measurement apparatus and a method acquiring a position information of an irradiation position of a quantum beam incident thereon, which allows acquisition/estimation of the position information without the need for a heuristic approximation for the calculation of the initial coordinates.

A further object is to unify the position calculation for position resolved measurement apparatuses. In accordance to one aspect of the present invention, an artificial neural network approximation is used to calculate the centroid coordinate of the electron cloud thereby calculating the position of an incident particle.

It is a further object of the invention to provide a position and time resolved measurement apparatus with an improved temporal resolution for time measurements of incident quantum beams. It is a further object of the invention to provide a simpler and more reliable time measurement method.

Throughout the following, the verb "estimating" or "measuring" may interchangeably used for the verb "acquiring". Thus, the term "acquiring position information" may also refer to "estimating position information" or "measuring position information". The "position information" includes "space coordinates", and therefore, when it is referred to the term "position information", the term "space coordinates" may also be used interchangeably.

Accordingly, a method for acquiring position information of irradiation of a quantum beam incident onto a position resolved measurement apparatus is provided, comprising: providing a position sensitive detector; providing an irradiation source; providing an artificial neural network structure coupled to the position sensitive detector and the irradiation source; training the artificial neural network structure to estimate space coordinates of an irradiation position onto the detector by feeding detector responses from known initial irradiation positions as an input into the artificial neural network structure and optimizing the artificial neural network parameters until the artificial neural network structure is able to estimate an initial position of irradiation as an output of the artificial neural network structure with a given accuracy; irradiating the detector by the irradiation source from an unknown position; measuring the response of detector upon irradiation by irradiation source from the unknown position; inputting the measured detector response as an input into the trained artificial neural network structure; calculating the output of the artificial neural network structure corresponding to an estimate of the spatial coordinates of the initial irradiation.

It is an advantage of the present invention that it is not required to use a heuristic model for the estimation. This problem is solved by using an artificial neural network. Advantageously, the resolution and/or linearity over the field of view of the geometry pattern of different position sensitive detector types can be improved. The measured responses can be directly used for the position calculations eliminating the modelling of the geometrical pattern of the anode. Further, the precision requirements for producing an anode are less restrictive. Furthermore, the neural network output function can be easily evaluated.

The artificial neural network approach of the present invention utilizes an artificial neural network to approximate a continuous function. Usually, artificial neural networks are employed for pattern recognition tasks like face recognition or particle decay process recognition. In pattern recognition, the neural network aims to recognize, e.g., if a pixel is black or white, i.e. zero or one. In contrast, function approximation is a much more demanding tasks since a continuous function needs to be approximated. Here, the function to be approximated is a function of the function of the detector response giving the initial coordinates of irradiation.

The training step of the artificial neural network structure in order to acquire or estimate the space coordinates of the initial irradiation of detector comprises the following steps:
i) irradiating the detector from a known spatial coordinate;
ii) measuring the resulting detector response;
iii) storing the detector's response and the known spatial coordinates of irradiation;
iv) repeating the above steps i)-iii) for different spatial coordinates sampling the space of irradiation;
v) feeding the measured detector responses as an input into the artificial neural network structure;
vi) calculating the resulting output of the artificial neural network structure corresponding to the spatial coordinates of the initial irradiation;
vii) calculating a function of the difference between the known initial spatial coordinates of irradiation and the present output of the artificial neural network structure representing the spatial coordinates;
viii) changing the parameters of the artificial neural network structure in order to minimize said function of the difference;
ix) if the calculated function of the difference is below a given threshold value, stop the training process, otherwise return to step v).

In another embodiment, it may also be feasible to return to step i) and to sample more positions or to improve the neural networks in a so-called on-line mode, i.e. after presentation of each detector response.

The detector's response may be related to measured charges in case of a charge-based detector as the position sensitive detector, or measured time in case of a time-based detector as the position sensitive detector, or measured currents in case of resistive anode detectors as the position sensitive detector.

The irradiation of the detector in the training step may comprise using a different, second irradiation source than the first irradiation source used in the actual estimation of coordinates or measurement process. Such second irradiation source is designed to allow irradiation from a given set of known spatial coordinates and may be, for example, an LED matrix.

The given threshold value for stopping the training process may be set to the size of the physical resolution of the detector.

The position sensitive detector may comprise an amplification device; and a position sensitive anode mounted behind the amplification device, with respect to the direction of irradiation.

The amplification device may comprise an electron multiplication device such as at least one micro-channel plate or at least one micro-sphere plate or at least one microgas amplification device.

The position sensitive charge division principle based anode may comprise at least two spatially divided electrodes. A position sensitive time-based delay-line related anode may comprise one delay-line per space coordinate.

The response of the detector may be a vector having the response with respect to each measured anode output value, i.e. charge for a charge division anode and time for time domain measurements, as its elements, and each vector element representing the measured response for an anode electrode is an input to a separate input node of the artificial neural network structure.

Accordingly, a position resolved measurement apparatus for acquiring a position information of an irradiation position of a quantum beam incident thereon is provided, the apparatus comprising: a position sensitive detector; an irradiation source; means for measuring the response of detector generated upon irradiation by irradiation source; an artificial neural network structure provided such that the measured detector response is the input to the artificial neural network structure and the initial space coordinates of irradiation are the output of the artificial neural network structure.

The irradiation source may be an electromagnetic radiation source or a particle source.

The position sensitive detector may comprise an amplification device; and a position sensitive anode mounted behind the amplification device, with respect to the direction of irradiation.

The amplification device may comprise an electron multiplication device such as at least one micro-channel plate (MCP) or at least one micro-sphere plate or at least one microgas amplification device.

The position sensitive anode may comprise at least two spatially divided electrodes.

The number of input nodes of the artificial neural network structure may be equal to the number of different spatially divided anode electrodes and the number of output nodes is equal to the number of different spatial coordinates of the initial irradiation point.

Several neural networks may be used to calculate different spatial coordinates components of the initial irradiation point. For instance, one neural network may be used to calculate horizontal coordinates of the irradiation point and another neural network may calculate vertical coordinate of the irradiation point. Furthermore, spatial coordinates of the initial irradiation point may be expressed in different coordinate systems: Cartesian (rectangular), polar, parabolic, etc. The output of the artificial neural network may be fed into another computation apparatus for further processing in order to minimize spatial distortions, for instance, utilizing triangular meshes, splines or polynomial distortion compensating approaches.

The position sensitive anode may be a time based or charge based detector. A time based position sensitive anode may be a delay-line detector or a delay-line related detector and a charge-based anode is a graded-density anode detector or a resistive anode detector or a multi-electrode anode detector.

The at least two spatially divided electrodes may be provided in a planar arrangement; or may be provided such that at least one of the at least two spatially divided electrodes is a non-planar electrode, or may be realized as a quadrant-anode with four planar electrodes; or as a quadrant anode with four planar electrodes and one additional fifth ring electrode arranged around the four planar electrodes; or may comprise at least one pyramid-like, cone-like, parts of the cylinder-like or sphere-like electrode, or comprises a two-dimensional array of diamond-like electrodes.

The artificial neural network structure may be realized as a feed-forward neural network, wherein the transfer function $F(p_i, q)$ of the artificial neural network structure is a nested function of non-linear vector functions f, wherein $p_i$ are the neural network parameters vectors and q is a vector having the detector response with respect to the measured value of the k-th detector output as its elements, and $F(p_i, q_k)=f_1(p_1, f_2(\ldots f_{n-1}(p_{n-1}, (f_n(p_n, q_k)))$. However, any other form of neural network may also be used, especially one with feedback.

Further, a calibration device for measuring the response of the detector to set points of irradiations is provided, comprising: means for irradiating the detector from known spatial coordinates; means for storing the initial spatial coordinates of the irradiation along with the measured detector response, i.e. a memory.

The present approach is not limited to the direct measuring of the electron avalanche but also can be used with decoupled position transmission detectors as disclosed in U.S. Pat. No. 5,686,721.

The neural network mathematical apparatus utilizes basic matrix-vector operations that are accelerated utilizing modern vector processing computers in order to achieve a required throughput of the whole system. The neural network could also implemented in hardware.

The neural network evaluation does not involve any multiple iteration steps and the computation time can be precisely calculated and predicted.

The number of neurons of the network can be varied in order to optimize a performance with a certain required level of approximation precision. For example, a real-time online display calculation can be done using a simplified version of the network in order to get preliminary results as fast as possible and then later, during the analysis of the data, a more complex computation with better accuracy can be performed.

A neural network is a cheap and simple way to simplify the structure of an anode while still achieving a desired estimation of the initial coordinates. There are two great benefits: 1) there is no need to produce custom micro-chips in order to acquire all the signals from hundred of anode channels; such a micro-scheme production of channels is very expensive. 2) in case of high-vacuum experiments employing MCPs as an amplifier, it is technologically impossible to put a very complex anode structure into a high vacuum volume due to the backing process needed by MCPs.

Furthermore, a neural network trained for one detector may need only a small number of new training points to fit a similar detector. Thus, the neural network approach increases the flexibility.

Also, the neural network can be trained to any possible structure of a detector. In case of approximations with parameter functions, often it is difficult to choose such functions for a given detector design. Here, again the neural network approach increases the flexibility. Using the method described here one may easily test different anode system configurations and get fast feedback about the position resolution capabilities of the particular anode configuration.

Moreover, since the neural network output function is a highly non-linear nested-function of employed transfer functions as basis functions, adding just one more node of the network in a hidden layer increases the fitting flexibility of the neural network substantially at small computational costs.

Another advantage is that additional inputs may be used in the estimation. The detector response depends on several parameters, like, for example, the electrical field applied in the position sensitive detector between the amplifier and the anode. A neural network approach allows using such detector parameters as an explicit input to the neural network in order to further improve or diversify the estimation. It would be highly difficult to do this in a heuristic, parameter function based approximation; Thus, not only the detector response may be fed into the neural network input nodes, but also a detector parameter may be fed into an additional neural network input node in order to build more precise mathematical model of the detector. Moreover, the input values can be pre-processed before being fed into the network.

In order to improve timing along with spatial resolution, the used position sensitive detector comprising an input face for transmitting a quantum beam incident onto the detector; a first electron multiplication cascade comprising at least one electron multiplication device arranged in a stack, the first electron multiplication cascade and the at least one electron multiplication device having each an input face and an output face, the first electron multiplication cascade being adapted to multiply a quantum beam incident on its input face, the input face being arranged facing the entrance face; an anode provided facing the output face of the electron multiplication cascade; a high voltage supplier providing a potential gradient from a more negative to a more positive potential between the input face and the output face of the first electron multiplication cascade, and means for measuring a detection timing pulse for timing the detection of the quantum beam incident onto the detector. The means for measuring a detection timing pulse is connected to an input face of one of the at least one electron multiplication device of the first electron multiplication cascade and an output face of one of the at least one electron multiplication device of the first electron multiplication cascade is connected to a ground potential, said output face being arranged between said input face and the anode.

In other words, the said amplification device is realized as the above first electron multiplication cascade.

Time resolved measuring detectors may be employed in time-of-flight based measurements. For example, LIDAR (Light Detection and Ranging) is an optical remote sensing technique to measure properties of a distant object. In order to determine the distance of a remote object, the time difference between the transmission of the light pulse and detection time of the reflected light is measured. Scanning technique shall be used in order to form an image using time only sensitive detector.

Time- and space-sensitive technology allows one to form an image along with timing information for each point of a continuous object of interest. Thus, an improvement of time- and space resolution eliminates the need in scanning and allows one to form a complete three-dimensional image of the whole object. Furthermore, position sensitivity allows one to measure additional properties of reflected light, like polarization and wavelength. This can be done by projecting spectrally separated images of the object to spatially separated areas of a single position sensitive detector, employing several detectors for sub-images separated by polarisation or wavelength or using alternating synchronized laserpulses for multi-parameter detection. The individual images are projected through the polarizer or wavelength filters selecting photons with predefined characteristics. Another example of time resolved detector application is fluorescence life-time imaging microscopy, a method to observe fluorescent particles in biological samples. Measuring the time difference between the transmission of the light pulse and detection time of the florescent photon, it is possible to measure the decay time of the exited state of fluorescent molecules. It is known that the decay time is dependent on an internal quantum state of the molecules and their microenvironments. In addition, it is possible to activate or convert photoswitchable dyes, measure their position and lifetime characteristics and bring them back to dark state. By combining time and position resolution improvement, it is possible to observe living samples continuously over long periods registering dynamic processes taking place inside the cell. Furthermore, it is possible to acquire simultaneously a complete set of parameters for each individual photon emitted by the sample: spatial position, arrival time, decay time, polarization and wavelength. A combination of the parameters brings additional information about the object of interest and results in a more reliable measurement. The present invention reads the timing signal from the input surface of an electron multiplication device. Advantageously, the signal taken from the input surface of the electron multiplication device is positive and does not result in high frequency oscillations in a post-pulse. This makes it easier to process the timing pulse and results in a more precise measurement. Advantageously, since a positive only signal is detected; the need of a zero-crossing detection scheme is eliminated.

Furthermore, the resulting signal amplitude is proportional to the amplitude of the electron avalanche generated by the electron multiplication device making it possible to employ precise software procedures for a time-amplitude correction for jitter compensation induced by the signal discrimination.

The at least one electron multiplication device of the first electron multiplication cascade may be realized as a microchannel plate or a microsphere plate.

Furthermore, curved channel MCPs or linear channel MCPs may be used. Curved channel MCPs are known from prior art to provide a higher amplification compared to plates with a straight or linear channel configuration. Advantageously, such MCPs may be used in an electron multiplication cascade comprising a single electron multiplication device only, while providing a high enough amplification for feeding it directly to the time interval measuring apparatus.

Advantageously, by such arrangement time- and position of the incident quantum beam can be measured by the device. The electron multiplication cascade being used in combination with a position sensitive anode results in a time- and position-resolved measuring detector. Such detectors have a wide range of applications, e.g. in minimal-invasive long period observation widefield microscopy, photoactivated localization microscopy (PALM), stochastic optical reconstruction microscopy (STORM), fluorescence lifetime imaging microscopy (FLIM), fluorescence lifetime imaging nanoscopy (FLIN), LIDAR devices, time-resolved tomography or numerous time of flight based measurements.

Advantageously, a great benefit of the present invention results from the independency of the timing signal shape on a voltage between the output surface of the last electron multiplication device in the electron multiplication cascades and the anode. This is in contrast to methods known in the art, which rely on the acquisition of the signal from the output surface.

The detector may further comprise a position calculator for calculating the detection position using a position signal from the position sensitive anode.

The input face, to which the means for measuring a detection timing pulse is connected, and the output face being connected to a ground potential may be realized as the input and output faces of a single electron multiplication device of the first electron multiplication cascade.

The first electron multiplication cascade may comprise at least two electron multiplication devices arranged in a stack, said input face, to which the means for measuring a detection timing pulse is connected, and said output face being connected to a ground potential may be realized as the input and output faces of different electron multiplication devices of said first electron multiplication cascade.

The at least one second electron multiplication cascade is provided between the input face and the first electron multiplication cascade and/or at least one third electron multiplication cascade may be provided between the first electron multiplication cascade and the anode.

The output face of one of the at least one electron multiplication device of the first electron multiplication cascade may be connected to ground potential via a high-frequency capacitor.

The ground potential to which said output face of one of the at least one electron multiplication device of the first electron multiplication cascade is connected to may be realized as a conductive ring surrounding all electron multiplication devices of the electron multiplication cascades.

The high voltage supplier supplies a separate voltage to each input and output face establishing a different potential gradient between said input and output faces of the at least one electron multiplication device.

The high voltage supplier may be connected to a voltage divider comprising resistors connected to each other in series in order to supply a different voltage to each input and output face of the electron multiplication devices, wherein a point of the voltage divider between two resistors is connected to ground via a second high frequency capacitor.

A current limiting resistor may be arranged between the high-voltage supplier and the input face connected to the means for detecting a timing pulse.

A decoupling capacitor may be provided between the means for detecting a timing pulse and said input face and between said current limiting resistor and the high voltage supplier to decouple a high-voltage part of the detector from the output line of the detector to the means for detecting a timing pulse.

An impedance equalizing resistor may be connected in parallel to an output line of the detector to the means for detecting a timing pulse, its resistance being adapted to equalize an input impedance of an amplifier of the means for detecting a timing pulse and/or the input impedance of the output line itself.

The means for detecting a timing pulse may comprise a first electrical input to receive a detecting timing pulse from the detector via the decoupling capacitor; a second electrical input to receive a reference signal generated by a reference signal generator of a pulse irradiation source emitting the quantum beam incident onto the detector; a discriminator connected to the first electrical input; a delay line connected to the second electrical input; and a time-interval-measuring device being connected to discriminator for providing a start signal and being connected to the delay line for providing a stop signal to the time-interval-measuring device. The means for detecting a timing pulse may further comprise a high-frequency signal amplifier connected between the first electrical input on its input side and the discriminator on its output side.

The anode may be a charge measuring anode and a time correction may be applied in the form of $TR=T0-F(A)$, where TR is a corrected value of time, T0 is a measured time by the means for detecting a timing pulse, A is a sum of all the measured charges, and $F(A)$ is a correcting function. The anode may be a position sensitive charge division anode and the time correction function may be $F(A,X,Y)$, where X- and Y- are space coordinates of detection. The correction function F may be fitted by an additional artificial neural network as described previously.

Since the resulting signal amplitude used for the time measurement is proportional to the amplitude of the electron avalanche generated by the electron multiplication device, it is possible to employ time correction for a time-amplitude correction for jitter compensation induced by the signal discrimination.

In addition, it is provided a time resolved measurement apparatus for acquiring a timing information of a quantum beam, the apparatus comprising a pulsed irradiation source for generating the quantum beam; a reference signal generator for generating a reference timing pulse being synchronous to the excitation of the irradiation source; a detector as described above; and a data processor for storing the time difference between reference timing pulse and the detection timing pulse generated by said detector.

The detector may be a position sensitive detector having a position sensitive anode and the data processor may store a detection position and said time difference. The position sensitive anode may be realized as a set of electrically isolated electrodes. Such anodes, to give here examples, are: a quadrant anode, wedge-strip anode, multi electrode anode, or a multi-strip anode. Individual electrodes may be connected in order to form a pattern for direct position measurement. An example is implemented in the so-called Vernier anode. The pattern can provide direct measurement of the position or may employ a computing module to calculate the coordinates.

The electron multiplication cascades of the detector may be arranged in a vacuum, the anode being a position sensitive external anode arranged outside the vacuum, and a high-resistive decoupling layer may be provided in the vacuum between the electron multiplication cascades and the anode and connected to the anode.

The high-resistive decoupling layer may be made of a semiconductor material, preferably Germanium.

The external anode may comprise x- and y-sensing elements provided in the same plane having non-overlapping structures and being arranged on an insulating layer, wherein each sensing element of one direction is connected to each other in-plane of the x- and y-sensing structure, and the sensing elements of the other direction are connected to each other below the insulating layer.

The x- and y-sensing elements may have a diamond-like structure.

One of the aspects of the present invention does not require using several spatially separated MCP multiplication cascades containing one or more plates. It is technologically preferable to build a single stack of two or more MCP's inside the detector. Such assemblies are the standard commercially available products and can be employed without any modification in vacuum-housed setups for needs of time-resolved or time-and-space-resolved particle detection. Moreover it is preferable to use standard MCP assemblies in vacuum-sealed devices as well.

BRIEF DESCRIPTION OF THE DRAWINGS

The present invention shall now be described in more detail of with reference to the accompanied drawings. It is however noted that the drawings are presented for illustrative purposes only and do not limit the technical scope of the present invention.

DETAILED DESCRIPTION OF THE INVENTION

Figure 1:
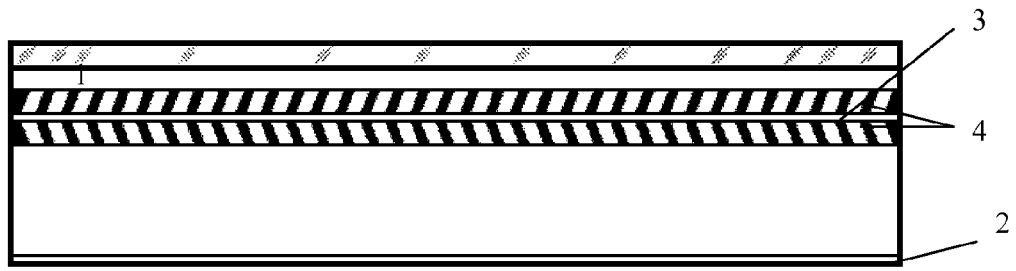
FIG. 1 shows a microchannel plate based position resolved measurement apparatus of the state of the art.

The invention will be described with reference to preferred embodiments. For easier understanding, identical or equivalent elements common to the drawings will be denoted by similar reference numerals.

The inventive apparatus device for acquiring or estimating a position information of an irradiation position of a quantum beam incident thereon, comprises a position sensitive detector; an irradiation source; means for measuring the response of detector generated upon irradiation by irradiation source; and an artificial neural network structure provided such that the measured detector response is the input to the artificial neural network structure and the initial space coordinates of irradiation are the output of the artificial neural network structure. For instance, reference will be made to the use of MCP plates as an amplification device. Charge-based multiple-anode systems will be described as a position sensitive detector. However, the invention is not limited thereto. The invention may also be applied to time-based delay-line related detectors. Required is only a detector response function and the aim to estimate initial coordinates of excitation or irradiation of the detector. The excitation may derive from an electromagnetic radiation source or a particle source. The means for measuring the response of the detector is preferably a detector readout system based on principles known in the art.

The present invention relies on a dynamic nature of the generated particle avalanche and eliminates the need to model the anode electrode pattern by a heuristic approximation. In order to compute positions of the initial particle, a multi-step procedure is performed.

The first step is the provision of a position sensitive detector and an irradiation source as well as a neural network structure coupled the position sensitive detector to receive its response upon irradiation.

The second step is the training of the neural network with detector responses from known spatial positions in order to predict the initial spatial positions with a given accuracy. This step includes the sub step of data sampling of responses for known spatial positions of irradiation of the detector.

The third step is to actually measure detector responses from unknown positions of initial irradiation, to feed in the detector response into the neural network input and to calculate the neural networks output as an estimate of the initial point of irradiation.

In detail, the method for acquiring or estimating space coordinates of an irradiation position incident onto a detector, preferably comprises the steps of training the artificial neural network structure with detector responses from known initial irradiation positions until the artificial neural network structure is able to predict an initial position of irradiation with a given accuracy; irradiating the detector by an irradiation source; measuring the response of detector upon irradiation by irradiation source; inputting the measured detector response into as an input into the artificial neural network structure; and calculating the output of the artificial neural network structure corresponding to the spatial coordinates of the initial irradiation. Thus, the neural network models the response function of the detector. The response function is the input to the neural network, the initial coordinates of excitation are the outputs.

At first, a training of the neural network is performed to "learn" modelling an initial position of irradiation upon receiving the detectors response function. This is done by the following steps:

i) irradiating the detector from a known spatial coordinate;
ii) measuring the resultant detector response;
iii) storing the detector's response and the known spatial coordinates of irradiation;

iv) repeating the above steps i)-iii) for different spatial coordinates sampling the space of irradiation;
v) feeding the measured detector responses as an input into the artificial neural network structure (7);
vi) calculating the resulting output of the artificial neural network structure corresponding to the spatial coordinates of the initial irradiation;
vii) calculating a function of the difference between the known initial spatial coordinates of irradiation and the present output of the artificial neural network structure representing the spatial coordinates;
viii) changing the parameters of the artificial neural network structure in order to minimize said function of the difference;
ix) if the calculated function of the difference is below a given threshold value, stop the training process, otherwise return to step v).

Thus, the initial space of irradiation is modelled, preferably extensively, from known given spatial coordinates of the excitation source. During the training, the function of the difference between the known initial spatial coordinates of irradiation and the present output of the artificial neural network structure representing the spatial coordinates will be minimized. Such a function is called a cost function and may be implemented, e.g., as the root means squared error (RMSE). After a certain number of presentations of the different detector responses to the neural network, this error function will be minimized and levels off. If the measured error is below a given threshold, the training is stopped and the neural network is able to model the response function of the position sensitive detector and the actual measurement and estimation of the initial coordinates can take place. The given threshold value for stopping the training process can be set to the size of the physically achievable resolution of the detector. The resolution is usually related to the channel dimension of a single amplification component. In case of MCPs, this is the MCP pore or channel diameter, typically ranging in 3-12 microns. Practically, in the presence of noise, this threshold value may be between 3-5 times the pore diameter. For instance, for a 12 micron MCP, the threshold may be set to 40-50 microns.

However, the threshold value may also be a function of the number of minimization steps.

Whereas the whole set of data is preferably fed into the neural network before the parameters are optimized, this could also be done after the presentation of each detector response to the neural network. The former is the so-called "offline" learning, whereas the later is the so-called "online" learning. Thus, the data sampling and the training could also be performed in a single step during data sampling. That means, the detector is irradiated from known positions, the response is measured and fed into the neural network, the neural network output is calculated and the parameters are optimized after each presentation of a single response and not just after the presentation of the whole set of responses.

The first step is the calibration of the detector. "Calibration" refers to a measurement of the detector's responses to the set of possible point excitations at a number of prior known positions. The calibration forms a part of the training of the neural network, i.e. the optimization of the neural network parameters, the so-called weights. In other words, the detector is used to measure its response function for the point exposure of given known positions.

The response or training set in case of a charge-splitting anode readout consists of the combinations of the measured charge values on the different anode electrodes. Due to the stochastic nature of the amplification, the charge combinations are vectors of the charges forming a line in the n-dimensional charge space, where n is a number of the individual output values of the anode.

In case of delay-line anodes that are meant to measure the coordinates explicitly, the measured preliminary coordinates themselves are fed into the neural network in order to predict the actual coordinates of initial irradiation. While the position information is measured directly, an additional neural network based post-processing allows one to correct the distortions followed from the non-homogeneously of the delay-line due to technological errors or tolerances.

The calibration or data sampling of the initial space of excitation for the training of the neural network will now be described in detail with reference to an example employing an optical LED matrix as the irradiation source. However, the excitation source is not limited to LED matrices.

Figure 8:
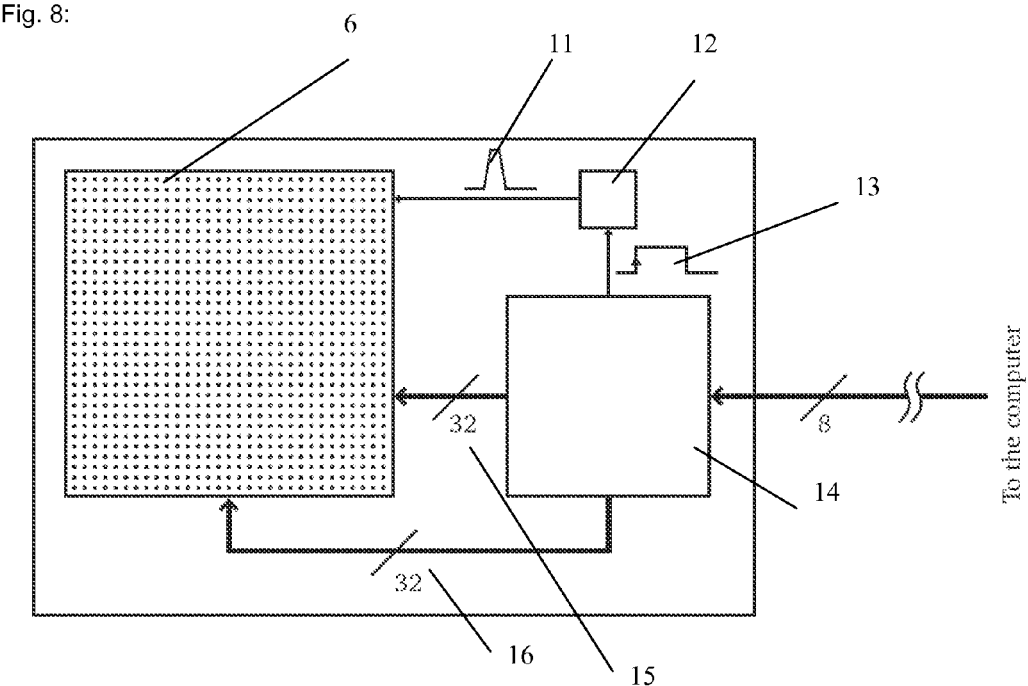
FIG. 8 shows an example of a position calibration device of a position resolved measurement apparatus of the present invention.
Figure 9:
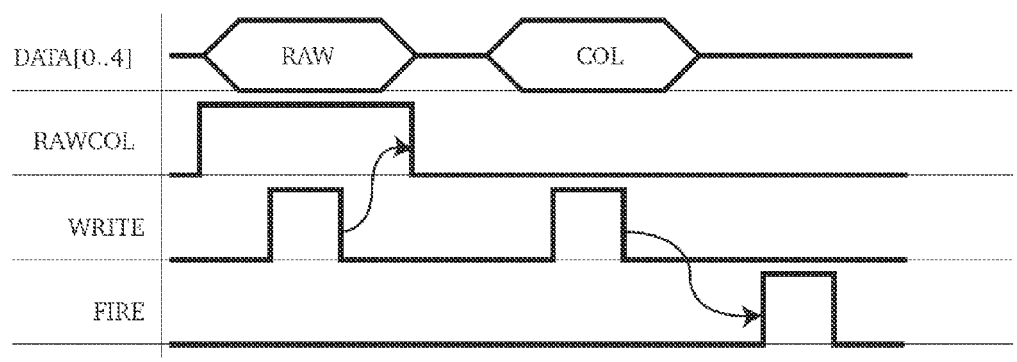
FIG. 9 shows a calibration signal-timing diagram of a position resolved measurement apparatus of FIG. 8.

In order to sample the initial space of excitation, one needs to send a photon or particle to known spatial positions of the surface of the front MCP in order to induce an electron avalanche, i.e. the initial position of irradiation corresponds to the initial position on the detector. Such a source shall accept commands in order to correlate the response of the detector and the position of the initial excitation. FIGS. 8 and 9 explain how to build such a light source to calibrate photosensitive detectors.

Position sensitive photomultiplier tubes (PMT) are a large family of the position sensitive MCP based detectors. The tube comprises a combination of a photocathode 3, an MCP 4 arranged in stack and an anode system 2 as shown in FIG. 1. This type of device can be calibrated using a manageable pulse light source. Such a light source shall provide the possibility to regulate the light intensity and the position of illumination.

The position sensitive PMT system comprises a vacuum-sealed assembly of the photocathode 3, MCP 4 arranged in stack and the position sensitive anode 2. The photocathode 3 converts an incident photon into a photoelectron. The photoelectron follows an applied electrical field and gets amplified or multiplied in the MCP stack. The resulting avalanche follows the electrical field and falls on the position sensitive anode 2. The anode 2 is a set of electrodes 5 (see FIG. 2 for a quadrant anode) that can be located inside the vacuum volume or can be mounted externally outside the vacuum utilizing vacuum decoupling techniques as described in U.S. Pat. No. 5,686,721.

A light emitting diodes array (LEDs) is used as an optical excitation source. Such arrays are widely used in many areas including streetlights, car lights and various displaying applications. In order to employ an LED matrix for the PMT calibration, a calibration assembly has been built as shown in FIG. 8. The assembly comprises a field programmable gate array (FPGA) chip 14, a tunable pulse current source 12 and a green LED matrix as an irradiation source 6. The core of the assembly is a logical scheme built on FPGA 14. The scheme accepts commands from a computer via a parallel TTL 8-bit protocol. The protocol, shown in FIG. 9, includes 5-bit DATA bus and a WRITE signal that triggers the storage of the DATA bus value to the row or column register 15, 16 depending on the state of the RAWCOL line. Shown is an explanation of an 8 bit interface to the computer. DATA is a 4 bit word that is sent by a computer to tell the FPGA 14 which row/column shall be set. ROWCOL signal tells if the ROW or COLumn register 15, 16 shall be set. If RAWCOL=1, the row register 15 is stored, otherwise the column 16 is set. The FIRE signal triggers the current source 12 to release a single current pulse 11 to activate the selected diode of the matrix 6. The duration and the amplitude of the current pulse 11 is subject to optimization depending on the LED type, mask hole diameter, detector photo cathode etc. The amplitude can be changed by applying different voltages to the pulse current source. The duration is tuned by the time constant of an RC chain. However, for the calibration assembly an array of radiation source is just required with known positions of the radiation source, wherein each individual radiation source can be driven or triggered separately.

An image of the LED matrix 6 covered by a non-transparent mask with holes is transmitted to the surface of the photocathode using a commercially available photo objective.

Thus, the calibration requires the following steps:
trigger a single radiation source of an array of radiation sources to emit radiation;
measure the detector response;
store the position of irradiation and its corresponding detector response.

These steps should be performed until at least all different radiation sources of the array are used. If the possible initial space of irradiation is not sufficiently covered, e.g. due to the size of the radiation source array or the distance between the radiation source, the radiation source array may be shifted to a different position and the above steps are repeated.

In a more detailed example of a complete optical calibration or data sampling setup comprising a PMT with a position sensitive anode, a detector electronic module, a computer and an inventive LED calibration assembly, the following steps are performed:
1. set variables $M_x$, $M_y$ to zero;
2. randomly select a row and a column in the LED matrix 6 and store the coordinates of the diode into variables $t_x$ and $t_y$ representing the row and column number;
3. check the distance between points ($t_x$, $t_y$) and ($M_x$, $M_y$); if the distance is less then ¼ of the total area diameter return to the step 2; (this step eliminates the influence of the lack of electrons inside the MCP channels during a recovery time after the previous avalanche has been emitted);
4. store $t_x$ into $M_x$ and $t_y$ into $M_y$;
5. send a current pulse to trigger the respective diode to emit light;
6. set a time interval to wait for the event and allow a data write to the computer;
7. after the time interval is over, forbid the computer to accept the data from the detector electronic module;
8. check the number of the photons registered during the wait interval, if there are no events, proceed to step 2, if there has been more than one event recorded, erase them and return to step 2;
9. store the measured detector responses along with the row and column numbers of the LED in the matrix;
10. check if the number of the events collected is sufficient for further processing and analysis; if not, return to step 2; else finish the program.

The coordinate of the excitation shall preferably be selected randomly in order to avoid saturation effects of the individual MCP channels.

The algorithm guarantees a low number of multi-photon events comparing to the total number of data records. The algorithm can be used for any type of position sensitive anode readout system independently of the number of individual electrodes or type of anode system.

The output of the above simple or more detailed algorithms is a set of records holding the detector response and the spatial coordinates of the excitation point. If the anode comprises a large number of electrodes or the number of points is not sufficient to describe the response function with required level of detail, the matrix may be shifted by a fixed and known distance and a calibration procedure shall be repeated. Such a shift can be made by mounting the LED matrix on top of a micro- or nano-stage that provides sufficient precision.

The above device employs a pulsed device. However, it is even not necessary to do so. A low-intensity continuous irradiation point source that excites the detector from a known position can be used. After acquiring a sufficient number of events, the source shall be moved to another position having precisely known coordinates.

The calibration procedure can also be applied for detectors with anode systems where the coordinate is the directly measured parameter like delay-line and cross-delay line anodes. The direct measurement of the detector response and applying the sampling algorithm in the present invention allows compensating non-linear distortion effects of delay lines. Such effects, for example, could be the result of the integral non-linearity of the time measurement devices used to measure the time difference between the pulses on the ends of the delay-line.

In the following, another example for a vacuum setup calibration will be described. There are a number of detecting systems utilizing position sensitive electron multipliers known from the prior art for the needs of experimental nuclear physics. Such systems usually include an assembly of an MCP stack and a position sensitive anode located inside a large vacuum volume, such as a chamber of an accelerator, X-ray source or the part of a larger vacuum setup.

A data sampling approach similar to the above-described approach for optical systems can be used for the calibration. An electron gun may be used as a position manageable electron source. The calibration procedure algorithm is similar to the above approach except that step 2 now employs an electron gun at different initial positions. In case of the electron gun, $M_x$ and $t_x$ variables hold, depending on the type of the gun, the voltage or the current used to modulate the x position and $M_y$, $t_y$ shall hold the values responsible for the y position of the output beam. The set of the x and y values is not limited to the fixed number or size of the LED elements and shall be chosen depending on requirements to the number of the calibration points for sufficient sampling.

A further example of calibration may include mask-like calibration methods. In the art, many anode system types following the charge division principle relying on a static computation model are known. This implies the following point: ignoring the individual peculiarities of the detector exemplars is a minor source of error. In other words, the device instances may be different but they are similar from the point of view of position computation. The same assumption can be made regarding the ANN based computation algorithm. Once the neural network is built and trained, it can be directly applied to the same anode type as it was originally built for.

This fact is used to minimise the training time for the next instance of the same or similar anode configuration based detector. The number of the iterations is reduced dramatically if an initial set of weights and biases are reused from a known detector comparing to the number of iterations used for a random starting point in a weights space. Usually, the parameters are randomly initialized. Another aspect is an ability to simplify the process of calibration. In many cases it is problematic to employ the electronic gun, LED matrix or other manageable and dynamic sources of irradiation. Thus, for training, one could use data points sampled for a similar detector.

The purpose to use computer-driven irradiation sources is an ability to store the positions of the exposures along with detector responses in order to form the training set. In some cases it is difficult to build a stable and reliable mathematical model of the anode in order to estimate and separate different excitation points from each other without knowing the exact positional information. Utilizing a prior built ANN model for a certain anode type allows one to separate the exposure points from each other and identify them. In case of the vacuum based setup it is convenient and easy to employ a non-transparent mask placed in front of the MCP with holes for irradiation. The optical calibration of the PMT can be simplified by using a non-transparent mask and a low-level intensity irradiation source. This will eliminate the needs of special devices.

The first step of calibration will include the continuous counting of the particles or photons coming through the mask of known geometry. The second step is to apply the prior known ANN in order to separate the exposure points from each other. If the calculation distortions are too large and it is impossible to get clear separation of the neighbouring calibration points, it is necessary to reduce the number of sampling points and to repeat the measurement iteratively in order to reach a sufficient number of points for precise coordinate interpolation.

The third step is to train the network to compensate the distortions resulting from the difference between the anode/detector instances.

Training the Neural Network—Step 2: the Training of the Network Itself

The resulting dataset of the calibration step is a set of points of the mapping of the (x,y) position of an incident particle space into the multidimensional readout space of the detector anode system. In other words the detector can be treated as a computational device that calculates the response for the point excitation.

Mathematically this can be described as following:

$$q=Q(x),$$

and the position shall be calculated by function F:

$$x=F(q)$$

where q is a vector of the response of the detector readout system for point excitation at the position of vector x. The function Q is a function that is "calculated" by the detector and F is a function that shall be calculated in order to recover an initial position of an incident particle from the known detector response. In other words, the goal of the whole procedure is to build the inverse function of Q.

As it is described in prior art, anode systems are built based on an approach of heuristic assumption of the mapping of the anode response to initial coordinates. The inverse function of this mapping can be found and calculated based on a geometrical properties of the anode by modelling the electron cloud footprint or the anode systems that are built to measure the coordinate directly. In a WSA, see U.S. Pat. No. 4,395,636, the position calculation is given by a formula that is a linear combination of the measured charges divided by the total amplitude of the signal in order to normalize the coordinate. The quadrant anode calculation method originally published by Lapington in 1976 relies on a ratio equation that is only proportional to the coordinate but not computes the position precisely.

None of the fixed model based approaches of the coordinate calculation can overcome the precision limitations of the manufacturing of the anode parts nor take into account individual geometrical properties of the complete detector assembly. The technological geometry errors may be negligible for a certain predefined level of the resolution requirements but cannot be eliminated completely. In other words it is technologically impossible to build two exactly the same detectors that will respond in precisely the same way as another piece. As a result, the response set of all the combinations of vector q for a fixed spatial coordinate x will differ from one detector instance to another, even when made by the same technology and utilizing the same materials. In other words, different detector instances will calculate a unique function Q and as a result the inverse function F(q) will be unique for each detector exemplar.

In order to take into account peculiarities of the individual detector instance or its pieces the detector is made of, it is necessary to correct the function F for each individual detector so that can be written as following:

$$x=F(p,q)$$

where p is a parameter vector that holds all the individual properties of the concrete detector instance as a complete system, including MCP amplification factor, different electron cloud footprints due to the difference in the electrical field between amplifier and anode, readout process and ADC conversion or peculiarities of the direct readout electronics or anode combinations.

Figure 10:
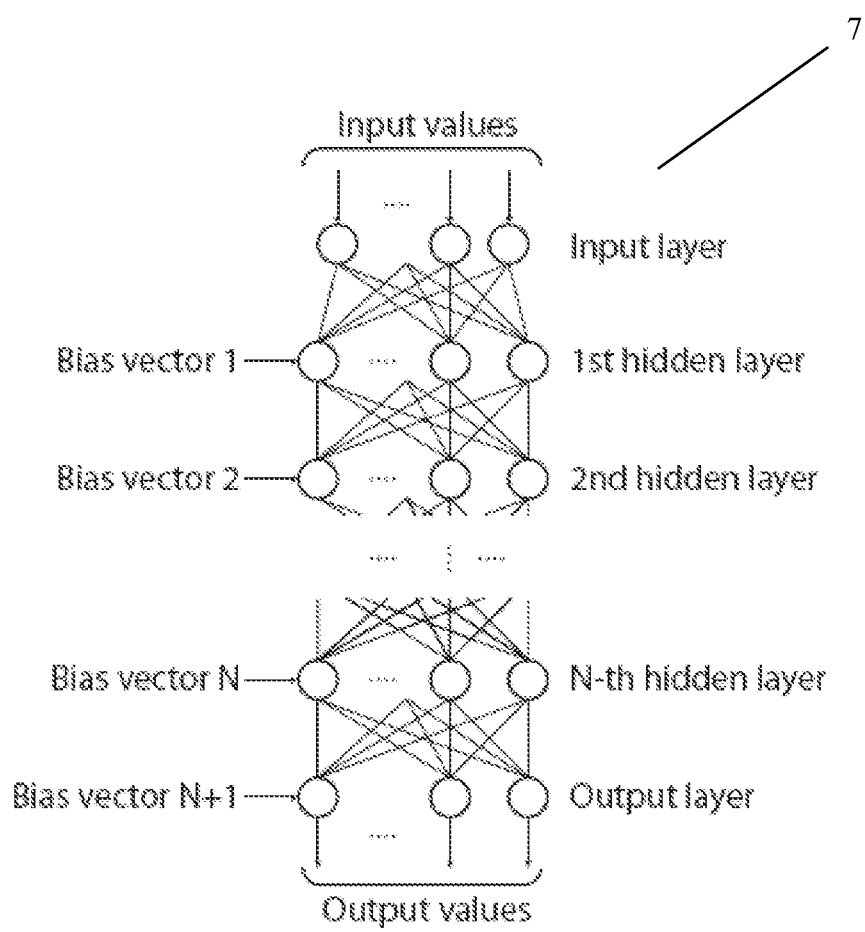
FIG. 10 shows a structure of a feed-forward neural network of a position resolved measurement apparatus according to the invention.

Artificial Neural Networks (ANN) were initially considered as a model of a biological neuron. They are widely used in pattern recognition applications, but less in function approximation, the more difficult task of the two. Nowadays, ANN are a powerful mathematical computation tool utilized in a wide range of applications. The feed-forward (FF) ANN is a special class of networks that represents a model of the nervous signalling without feedback information propagation. The signal is fed through the network in only one direction, from input to output. The FF-ANN comprises an input layer, a number of hidden layers and an output layer as shown in FIG. 10. However, hidden layers may also be missing. The input, hidden and output layer may consist of one or more neurons depending on the complexity of the model. Each neuron in the network has several weighted inputs, where the interconnection lines between the neurons in FIG. 10 correspond to a weighted connection, and one output:

$$y=f(\Sigma w_l x_l+b)$$

where the sum runs over l=1,n, n being the number of neurons in the previous layer, "x" is an n-dimensional vector of the neuron input, "w" is the so-called weights vector or parameter vector of the neuron and b is a bias or offset to the neuron. The function "f( )" is called transfer function. There is a number of functions that are commonly used as transfer functions:
  hyperbolic tangent defined as $f(x)=(e^x-e^{-x})/(e^x+e^{-x})$;
  the sigmoidal function $f(x)=1/(1-e^{-x})$;
  the linear function $f(x)=x$; or
  the saturated linear function $$f(x) = \begin{cases} -1 & x < -1 \\ x & -1 \leq x \leq 1 \\ 1 & x > 1. \end{cases}$$

However, other functions are known to be used as transfer functions of the neurons also.

The number of the inputs to a neuron in a FF-ANN layer is defined by the number of neurons in the previous layer. Each individual neuron output of the ANN is computed as a function of the weighted sum of its inputs. Usually, the function calculated by the neuron in FF-ANN is layer dependent. The calculation of a single layer of "n" neurons and "m" in the previous layer can be written in a matrix form:

$$y=f(WX+b),$$

where W is a weight matrix of the size n×m elements and consists of n rows, X is an m-dimensional vector of the output values from the previous layer and b is an n-dimensional vector of the layer bias, y is the n-dimensional output vector of the layer. The function f is meant to be calculated for each individual element of the vector.

Summarizing the above, the output of the whole n-layer FF ANN function can be written as the following:

$$y = f_n(W_n \ldots f_3(W_3 f_2(f_1(W_1 X + b_1) + b_2) + b_3)),$$

where X is the network input vector, $W_i$ the input weights matrix of the i-th layer and $f_i$ is the transfer function of the layer "i". Thus, the neural network output function is a nested function of the layers transfer functions allowing a great flexibility in fitting continuous functions.

In the present application, the input vector X is the response of the detector. For multi-electrode anode type position sensitive detectors, the response is a vector having a number of elements equal to the number of electrodes of the anode. Input vector elements may be raw detected values of measured from the electrodes or the result of heuristic based computation. For instance, using quadrant anode detector it is convenient to use the results of the ratio approximation known from the prior art minimizing the number of neurons and, as result, reducing ANN evaluation and training computation costs. In case of the anode systems with large number of elements it may be necessary to select only a part of values that exceeds certain threshold value in order to minimize influence of the noise component for the result in position computation.

In delay-line detectors, the response is a vector having a number of elements equal to the number of delay lines. For a two-dimensional delay-line measurement, two crossed delay lines may be used, one extending in the x-direction measuring the x-coordinate, one extending in the y-direction measuring the y-coordinate. The number of actual parameters fed into the ANN can also include results of pre-processing calculation phase.

The weights and biases, or in general terms, the parameters of the neural network correspond to the detector parameter vector that holds all the individual properties of the concrete detector instance as a complete system, including MCP amplification peculiarities, different electron cloud footprints due to the difference in the electrical field, readout process and ADC conversion or a peculiarities of the direct readout electronics/anode combinations.

The interpolation of the function by the ANN is called training. The training is the process of minimizing a cost function, e.g. a function of the norm of the vector differences of the ANN output and the target function, here the initial coordinates of irradiation of the detector. The norm can be defined as a sum of differences of the squares of vector components:

$$E = \Sigma (y_i - t_i)^2$$

where $y_i$ is an output value of the network, i.e. of one network output node, and $t_i$ are the components of the target vector. Depending on the structure of the network, different minimizing algorithms can be used. Also, different cost functions subject to minimization may be used.

The training set comprises the values obtained in the calibration step: the input values of the ANN are the response values of the detector for point excitation, the target values are the coordinates of incident exposures.

The complexity of the anode pattern defines the number of the neurons, which shall be employed in order to achieve the required level of precision. From the computational cost's point of view, the simplest possible structure is preferable in order to maximize the performance. The network can always be increased by increasing the number of hidden layers or nodes in the hidden layers to fit the desired values more closely.

The network may be calculated by a modern computing hardware or software, which introduces more and more vector computation features when the computing module comprises several arithmetic-logical devices in order to intensify vector based problem calculations to meet the requirements of many entertainment applications including real-time video processing, real-world gaming simulations etc. Being mainly vector based, the ANN calculation task fits to the commercially available entertainment hardware.

However, a neural network can also be implemented completely by hardware. Such implementation can be done using FPGA chips (Coric et al., "A neural network FPGA implementation", Neural Network Applications in Electrical Engineering, 2000. NEUREL 2000. Proceedings of the 5th Seminar).

Training the Neural Network

Example 1

An example of the neural network training will now be described with reference to an extended quadrant anode detector system allowing an improvement of the image quality of a quadrant anode.

First of all, the position sensitive detector is described.

The classical QA described by Lampton demonstrates high resolution down to the diameter of the individual MCP channel. The two major limitations regarding this anode are the strong non-linearity and the small field of view.

The present invention provides a simple way to overcome the non-linearity problem by applying the ANN apparatus in combination with the calibration procedure.

Figure 11:
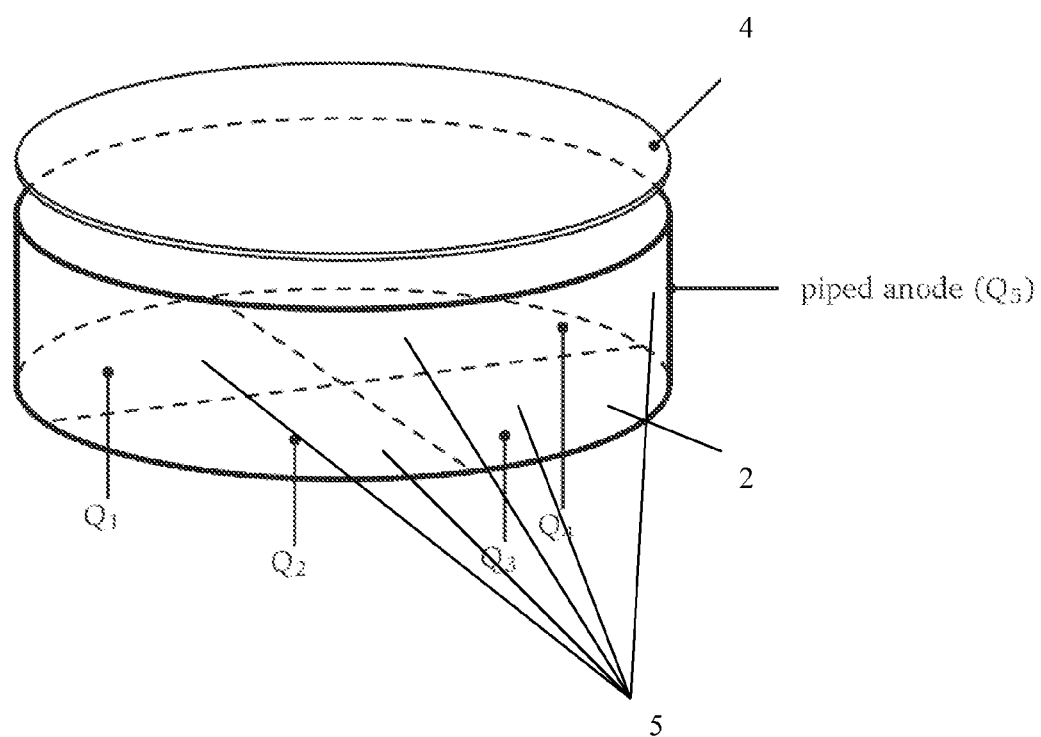
FIG. 11 shows an improved quadrant anode with an additional ring electrode of a position resolved measurement apparatus according to the invention.

The formulas presented by Lampton rely on the ratio equation that is valid in case of complete charge acquisition. As it was demonstrated by Purschke et al, enlarging the quadrants in combination with expanding the avalanche will result in larger a field of view. To build the vacuum-sealed device, it is technologically preferable to use elements of a same or similar diameter as the size of the MCPs. In order to overcome the limitation of the fields of view, a fifth surrounding anode $Q_5$ has been introduced as shown in FIG. 11. The fifth electrode 5 is arranged as a ring to surround the quadrant anodes $Q_1$-$Q_4$. This electrode is responsible for gathering the tails of the cloud charge.

The footprint of the electron cloud is varied by the voltage between the MCP stack 4 output and the anode 2 and is made to be comparable to the size of the individual quadrant. This results in a larger part of the electrons that is distributed far away from the centre of the avalanche. On the other hand, this allows to make the avalanche large enough to employ the charges from all of the quadrants along the whole field of view for position calculation.

The fifth anode is the extension of the QA. Such a configuration makes it problematic to build a stable mathematical model relying only on geometrical properties of the anode due to the complex shape of the large electron cloud.

Figure 12A:
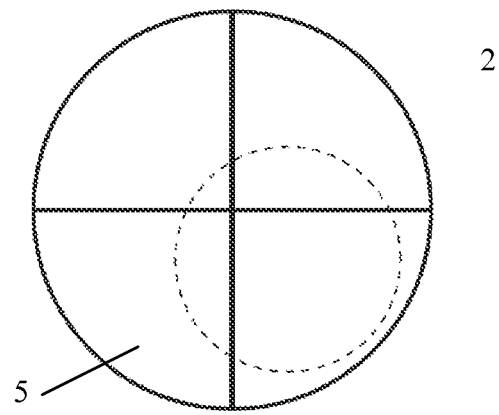
FIG. 12 shows multi-electrode anodes of a position resolved measurement apparatus according to the invention.
Figure 12B:
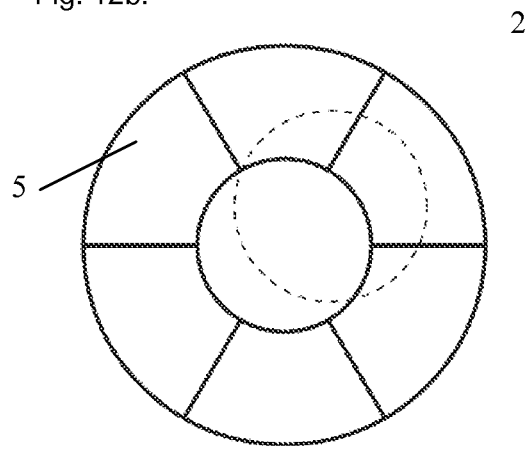
Figure 12C:
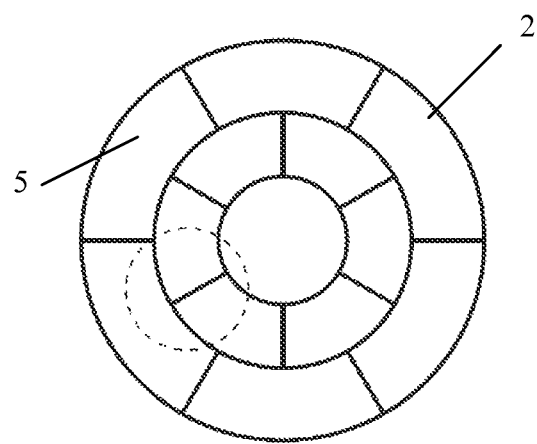

The advantage of the simple flat multi-anodes (FMA) structures, like quadrant anode or any other simple flat structure as shown in FIG. 12, where the dashed line corresponds to the electron cloud, when used in Single-Photon-Counting, is that very small capacitances between anodes and ground exist. Charge sensitive amplifiers (CSA) noise is strongly depended on the input capacitance. Therefore it is possible to use a short time shaping in analog amplifiers before analog-to-digital conversion, while saving the quality of the image. For example, 150 ns shaping may be used instead of 1500 ns, a typical value for complex anode structure such as the wedge-strip (WS) anode. It means that the present FMA-MCP-PMT may perform 10 times faster than the WS-anode MCP-PMT with the same precision of the position determination. The second advantage is the fact that the signal-to-noise ratio in analog channels with small magnification of the MCP stack is saved.

Therefore, the lifetime of MCP-PMT, the quantity of the charge carry out of MCP before sensitivity will decrease by two times, will being better by ten times than WS and resistive (R) anode cases. The amplification factor in case of the quadrant anode is about of $10^6$ versus more then $10^7$ in WS and R cases.

It is possible to include two MCPs only, against three or more MCPs in WS and R anode cases.

The technology of flat QA structure manufacturing is very simple and precise. Therefore the charge-position dependence will be sleek (plain) and the linearity of the position determination will be very high. The manufacturing of other anode systems (WS, R, delay line, micro-strip, etc.) is more complex. Local defects of the anode will be present and as result there would be no possibility to achieve high linearity of the image. In the present invention, it is possible to use the discrete calibration points to create the coordinate restoring algorithm without local defects and smooth interpolation between calibration points.

It is possible to generate a distortion free algorithm automatically. Any size of MCP-PMT can be modelled without any reduction of the position sensitivity (amount of the peak cell at full field of view). In case of another type of anode systems (WS, R, DL, etc.) it is very difficult to decrease the anode size. The resolution will be determined by an anode structure step (WS and DL) or resistance (R) and will be a constant value (in micrometer) for any MCP size. The resolution in micrometer (for example, 100 micrometer) will be the same for 10 mm, 25 mm and 80 mm field of view, therefore limiting the spatial resolution of the detector.

The main disadvantage of any FMA structure (including QA) is the resolution degradation on the edges of field-of view because the size of the electron avalanche for such anodes must be bigger than the size of each partial electrode in order to get spatial sensitivity over the whole MCP area. If the avalanche falls close to edge of an anode structure, that part of the avalanche charge will be lost. To acquire this charge, the conductive electrode $Q_5$ around the anode structure is used. Obviously the width of the simple flat surrounding electrode must be broad, i.e. more than one half of the avalanche size. Because the avalanche has a very broad tail, the part of the avalanche will fall out of the surrounding electrode $Q_5$ and will charge the insulator placed out of it. This charge will be collected at the insulator and pushes away (or distort the form of) the next avalanche. In result, only a smaller avalanche part will fall on the surrounding electrode $Q_5$.

To avoid this and to collect a meaningful part of the avalanche, a "piped" or ring-like anode hang over is used as an anode structure. The ring-like anode extends in the z-direction if the flat-structure quadrant-anode extends in the x- and y-direction.

The height of the ring-like anode should be equal to a typical size of the partial anode including a small variation and the ring-like anode must be placed in such manner that the insulator around the flat anode structure is covered as well as the area between the last MCP 4 and the anode structure 2. The form of the ring-like anode should repeat the outside form of the flat anode 2 structure. So, if the flat anode 2 has a circular form, the form of the ring-like anode should be cylindrical, if the flat anode has a hexahedron form the ring-like anode should have a hexahedron base form in section. Through this, it is possible to collect the full avalanche charge at such structure and to achieve better position sensitivity at the edges compared to the planar structure.

The advantage of a ring-like or cylindrical anode form is a smaller size compared to the full anode system. Therefore, there are no differences between the flat structure size and the size of the full anode system.

The usual QA with four anode electrodes has an area, where the position sensitivity is worsened. These parts are located at each quadrant centre. To avoid this disadvantage, the more complex flat structure with 5, 6, 7 or n anodes as shown in FIG. 12 can be employed with an additional ring-like anode.

Because the electron avalanche size will be smaller than that of the simple quadrant case (20 mm quadrant anode avalanche for 25 mm field of view correspond 400*400 resolution), the position sensitivity will be better (12 mm avalanche for 25 mm field of view corresponds 650*650 resolution, 7 mm avalanche for 25 mm field of view corresponds more then 1000*1000 resolution) and the worse resolution area will be removed.

Of course, more complex flat structures with ten or more identical area partial anodes can be constructed in order to achieve the resolution as good as required for full field of view. But without a suitable surrounding electrode, the resolution on the edge of field of view will be worsened.

Therefore, the full resolution of such flat structure will depend on quantity of the partial anodes and will be high and uniform for each point of field of view when an additional surrounding electrode like a ring-like anode are used.

To use neural networks to estimate the initial coordinates of irradiation of the above discussed detector system, the first step is to measure the responses of the detector to point excitations of well known spatial coordinates.

Figure 13A:
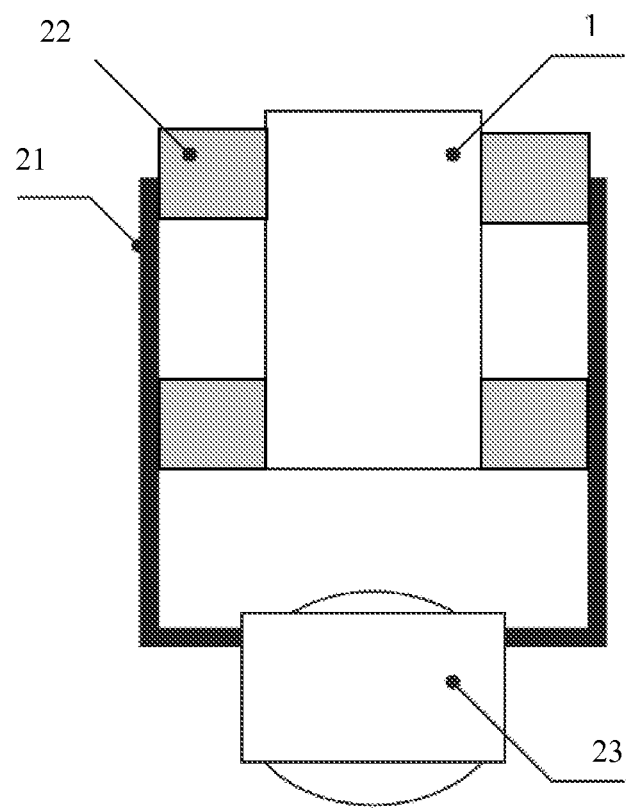
FIG. 13 shows a calibration setup scheme of a position resolved measurement apparatus of the present invention.
Figure 13B:
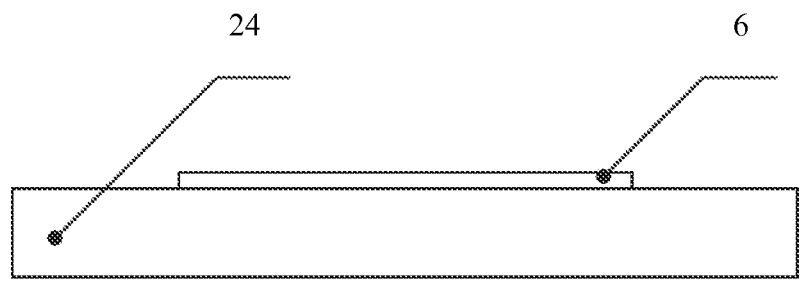

In order to acquire the input information required for the neural network training, a calibration setup was built (FIGS. 13a and 13b). The detector 1 is placed into a light protection chamber 21 using the holders 22 that allow vertical adjustments if required. A photo objective 23 mount is built into the front flange of the chamber. The objective projects the image of the LED matrix 6 to the surface of the photocathode. The matrix module is mounted on top of a motorized stage 24. The detector holder is mounted to the photo-projecting device that allows precise movement of the detector along the vertical axis to form the image with optimal scale on a surface of the photocathode. A motorized stage 24 is used to control the two horizontal orientations.

Another role of the motorized stage 24 is increasing the number of control exposure points without changing the matrix 6. A standard microscopic stage 24 was used to control the position of the matrix 6.

An extended quadrant anode in the x-y plane with the fifth surrounding electrode, extending in the z-direction, photomultiplier tube has been used. The electronic module includes five independent spectrometric channels to measure the generated charges upon irradiation by the irradiation source 6. The single channel includes: charge-sensitive amplifier, a set of shaping filters, 12 bits analog to digital converter (ADC) and the digital output interface. A triggering signal of the discriminator synchronizes all the channels. The digital interface device is responsible to acquire the information from ADC's, form the package and send it to the computer.

The detector is operating in a single photon counting mode. By measuring an amplitude distribution of the total charge, i.e. the sum of all the charge parts measured from the separate electrodes, one can control the correctness of the single photon operational mode. The saturation of the MCP channels results in lower amplification factors and as result will move the position of maximum of the distribution to the left (area of smaller electron avalanche amplitudes), with respect to the direction of origin.

The multi photon events result in a secondary peak right (larger amplitudes) to the main one.

The light intensity is controlled by two methods: tuning the aperture of the objective and by variation the pump current of the diode. The current method is preferred because of the objective resolution dependence on aperture size. The aperture has been set to achieve maximum possible resolution.

The computer driven LED matrix is controlled by logic scheme build on a Field Programmable Gate Array (FPGA) device. The device is able to accept the commands form the computer and make the LED matrix to emit short portion of light when requested. The matrix has 32 rows and 32 columns with the space of 2.54 mm (1/10 inch). The surface is covered by a non-transparent film made by a photo-plotting technology with the hole diameter of 254 microns (1/100 inch).

The calibration with the LED matrix 6 is a cyclic multi step algorithm that has been described previously.

After the sufficient number of photons for every single LED position is acquired, the algorithm stops. Experimentally it was found that 8 000-12 000, preferably 9.000-11.000, even more preferably 10.000 individual event measurements per single point of the irradiation source or initial space coordinate of excitation are sufficient to precisely reconstruct the detector response function of the extended QA over the whole field of view.

In case of more complex anode systems, the matrix is measured several times with specific offsets between the points using the motorized stage 24.

The output of the calibration algorithm is an array of the structures: (x, y, q1, q2, q3, q4, q5). Where (x,y) are the row and column number of the diode in the matrix and (q1, q2, q3, q4, q5) the measured charges of the detector responses with respect to the five anode electrodes. The total number of structures depends on the number of LED's and number of photons acquired for each calibration point. The field of view of the MCP based detector normally lies around the number of diodes visible by the detector, here in a range from 780 to 830 out of 1024 diodes (32×32). Thus, the training set may theoretically comprises (8.000 to 12.000)×1024 data structures including initial lateral coordinates and the respective responses, or practically (8.000-12.000)×780 data structures, i.e. between 6.2 million (8.000×780) and 12.3 million (12.000×1024) data sets, more preferably between 7 million (9.000×780) and 11.3 million (11.000×1024), even more preferably between 7.8 million (10.000×780) and 10.24 million (10.000×1024) data structures.

The optimal projection is controlled by evaluating the histogram of the number of the registered events for each diode. The histogram gives immediate visual control of the axial symmetry, homogeneously of the illumination, tilt and skew control etc.

Photomultiplier tubes as examples of the position sensitive detector are known to have a low level of background noise. Typical background count rate is in a range of 10-100 photons per second over the whole field of view. Typical repetition rate for the calibration experiment falls in range 8 000-11 000 counts per second. As a result, the photo-detector background noise will contribute less than one percent to the final dataset. This results in a huge dynamic range of the imaging sensor. Such a high dynamic depth of registration may results in a number of tasks that may need to be solved by data pre-processing:

the material of the LED matrix base is made of plastic and does not provide full protection of the light to go into neighbouring positions; that is the system records the (x,y) coordinates of the single source with portion of the photons that were emitted from the neighbouring positions/channels;

every material is reflective on a single photon level; there is non zero probability to reflect an incident photon that will be later registered by the detector; this results in a homogeneous background noise over the field of view.

reflections inside the objective.

In order to provide easy and fast access to the experimental data, the complete array of acquired data is sorted according to the coordinates of the diodes.

After the sorting for every point of the matrix, a multidimensional histogram is built in charge space. The values below the threshold are considered to be noise and are eliminated from further processing. For the 12 bits ADCs (4096 channels) that are used with the extended QA anode system, the histogram bin size of 32 channels was chosen as a compromise between the number of the bins and the probability to keep useful information for further processing. In other words, if one chooses the cell size to be small (in a limit of 1 channel) part of useful events will be treated as a background noise due to the lack of statistics. Large bin sizes on other hand will result on keeping noise event in a data set.

To build a histogram of the values of high dimension, a large amount of memory is required. For instance, 4096 total channels with binning of 32 will result in 128 bin channels per dimension of freedom. For the extended QA with five electrodes this will mean $128^5=34\,359\,738\,368$ bin cubes. In order to overcome the memory problem, the following approach has been used: for every event the binning combination along of all charge axis's was calculated and stored in a dictionary; in case that the combination exists as the record in the dictionary, the value associated to such combination is increased by 1. As a result, the dictionary holds a number of neighbours for each event. During the second pass the binning is calculated once more and a threshold filtering is applied.

After removal of the noise, the neural network-learning algorithm can be used. However, if noise is low, the previous filtering step can be omitted. Also, after the above threshold filtering, a median filtration may be used based on a polynomial approximation. Each individual charge is interpolated as a square polynomial of the signal amplitude. This minimizes the size of the leaning set of the neural network and speeds up the learning process by taking into account only the central parts of the events distributions.

For the extended QA, the following configuration of a feed-forward neural network was used: 5 inputs representing the five anode electrodes are connected to 23 hidden neurons in a first hidden layer calculating a hyperbolic tangent function. The second hidden layer holds 23 neurons calculating a sigmoid function as the transfer function and two output neurons are used that represent the (x,y) space coordinates of the initial photon.

The configuration of the network has been discovered experimentally. By using the network with one output for each coordinate, the number of the neurons can be reduced. On the other hand, in practical matrix computations it is faster to process one set of coefficients (weight matrices) instead of two independent sets for higher performance utilizing vector calculation extensions of modern computer systems.

The Levenberg-Marquadt algorithm of non-linear minimization is used to find weight coefficients of the network, i.e. for optimization of the neural network parameters.

The stop criteria for the training procedure is related to the employed optimisation algorithm, here the Levenberg-Marquardt algorithm. There are two ways that define a stop criterion:

1) when the error for each calibration point falls below the physical resolution of the detector limited by the analogue electronics processing pipeline noise, ADC bit width etc.; the training is stopped if further training does not change the outputs more than the measurement noise does;

2) when the gradient is less than certain value; usually, this value is related to a multiple of the computational error of the processor.

With the number of the calibration points exceeding 1000-1200, it is practical to shift to gradient-based minimization or optimization methods that do not require the precise computation of the second derivative.

Training the Neural Network

Example 2

Moreover, also decoupled multi-segment anodes can be employed. U.S. Pat. No. 5,686,721 discloses the method for isolating the readout anode system from the high-vacuum internal detector volume. The charge of the avalanche is measured directly on the outer surface of the resistive layer outside the detector. This allows one to easily couple an FSA structure.

In order to apply the method for the charge-image devices, the anode readout pattern was formed on printed circuit board using standard technology. The charge sensitive amplifiers are connected to the open parts of the board. The same calibration procedure as described above is applied.

For the five electrodes structure exactly the same neural network configuration was applied to calculate the coordinate as in case of the vacuum-sealed extended QA anode device.

For a multi-electrode pattern the network configuration has to be changed. Otherwise the increased number of inputs results in a worsening of the training speed and stability. Two networks may be employed to calculate the coordinate along horizontal and vertical axis independently. For instance for a nine-electrode pattern, each network has 9 inputs 40 hidden neurons and one output. The training procedure is performed for each separate network, fitting the coefficients of the network to map the measured charges to the required coordinate.

To conclude, the QA is a one of the simplest possible patterns that brings the following benefits: cheap and simple production and low intra-electrode capacity resulting in high precision charge measuring and high throughput.

The calibration setup does not require any special equipment except a simple LED matrix with a computer interface. The computer driven system gives continuous control over the calibration experiment.

Figure 14:
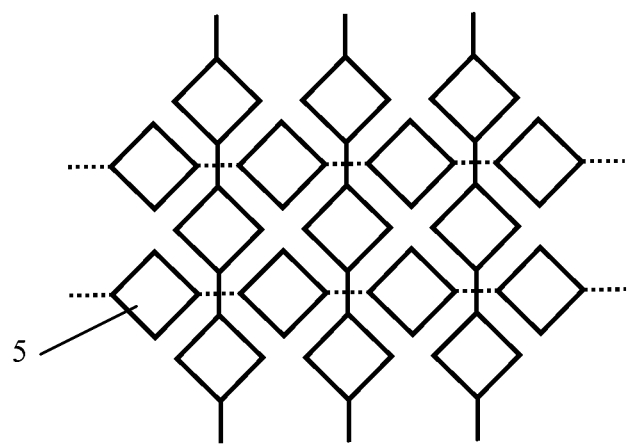
FIG. 14 shows a multi-electrode anode with diamond-like electrodes arranged in a two-dimensional array as a position sensitive anode.
Figure 15A:
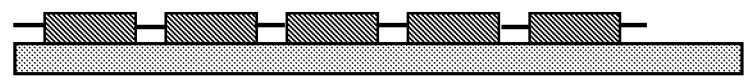
FIG. 15a shows a wiring of the vertical or y-electrodes of FIG. 14.
Figure 15B:
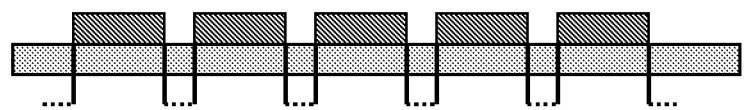
FIG. 15b shows a horizontal wiring of the horizontal or x-electrodes of FIG. 14.

FIG. 14 shows another possible multi-electrode anode assembly with diamond-like electrodes arranged in a two-dimensional array as a position sensitive anode. FIG. 15*a* shows the wiring of the vertical or y-electrodes of FIG. 14 and FIG. 15*b* shows the horizontal wiring of the horizontal or x-electrodes of FIG. 14. External charge-dividing anodes, as described above, should have their x- and y-sensing elements within the same plane, in particular in crossed-strip systems, where current design results in two different planar positions, separated by an insulating layer and a filling factor of only up to 75%. As shown in FIG. 15, vertical or y-arranged diamond-like electrodes are connected in-plane as indicated by the solid lines in FIG. 14. Horizontal or x-electrodes are connected below an insulating layer.

The advantage of such a design is that the size of the diamonds can be increased until almost touching each other, with 99% area covered, while employing identical sized and structured x- and y-collecting elements, in contrast to cross-strip anodes of the state of the art.

The method described in the invention is common for any configuration of the anode electrodes and does not depend on a number, shape or geometrical property of the anode.

A position and time-resolved apparatus according to the present invention additionally measures the arrival time of the irradiation particle in response to irradiation pulse release. Such time resolution will now be described by the use of FIG. 16-25. It is however pointed out, that any of the above mentioned embodiment features may be used with all the following embodiments. Thus, while describing an anode system throughout the following, this anode system may be one of the above embodiments. Especially, though not shown in the following figures, in all of the following embodiments an artificial neural network as described above may be connected to the different described anodes systems to provide a position resolution.

A position and time-sensitive detector may only comprise a single electron multiplication cascade with a single electron multiplication device and an anode. One measures time by employing the time signal as described below.

Figure 3:
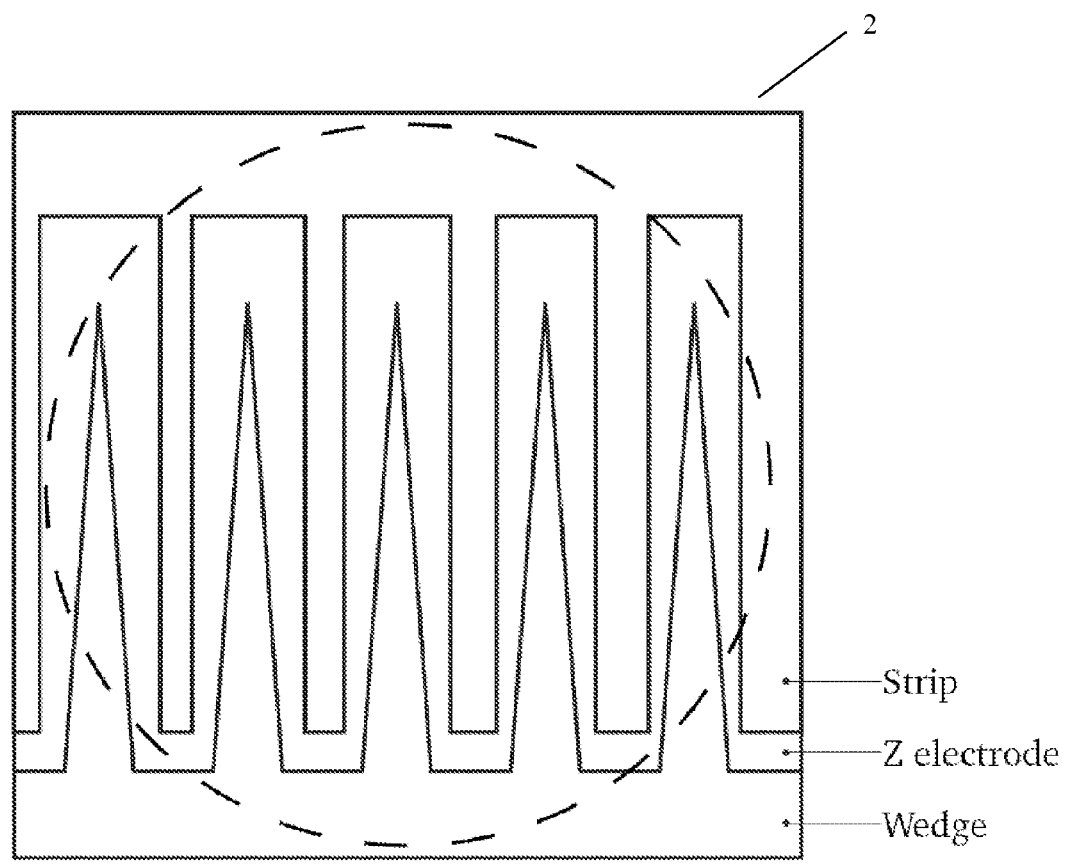
FIG. 3 shows a wedge-strip anode of a position resolved measurement apparatus of the state of the art.
Figure 4:
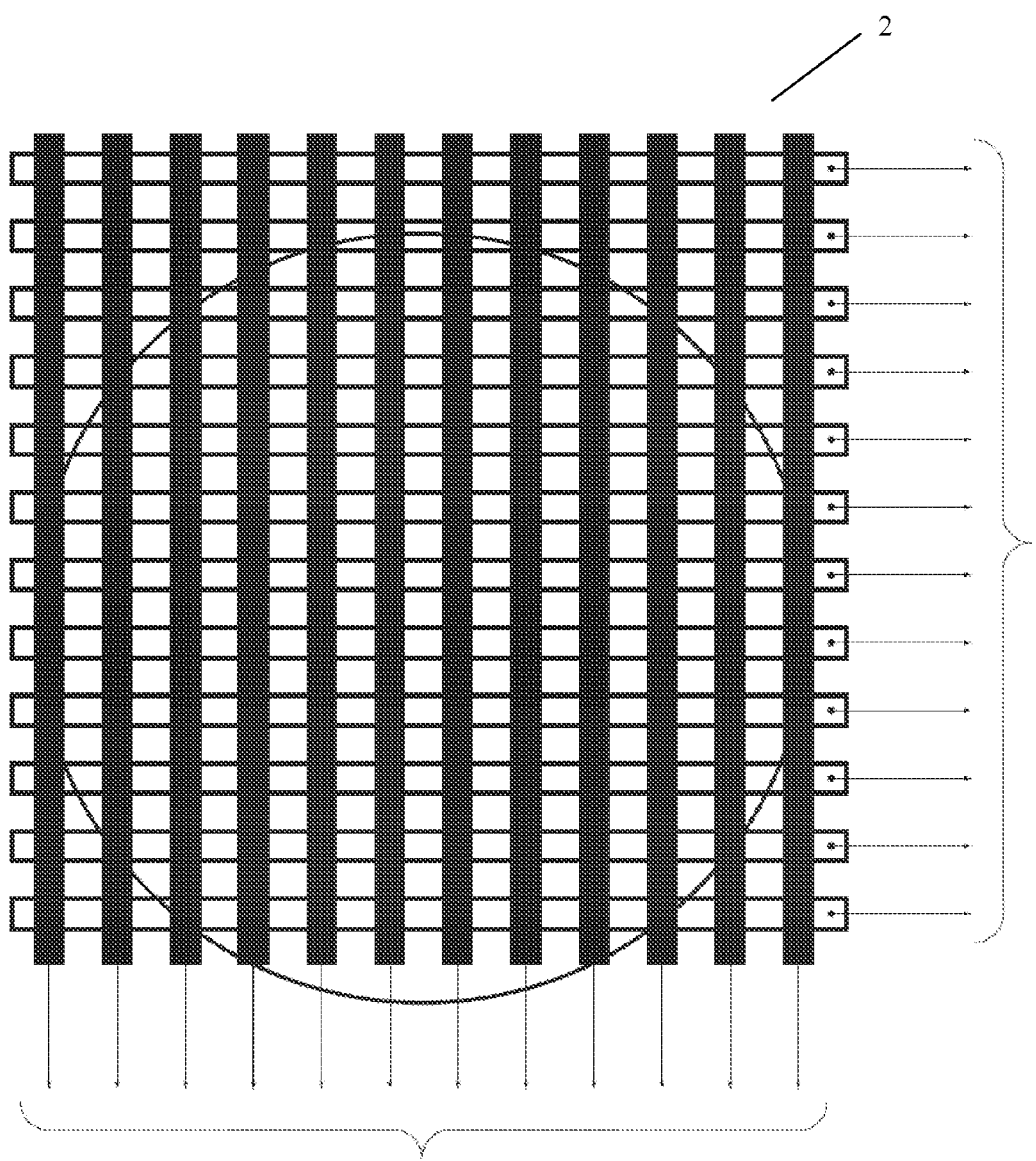
FIG. 4 shows a cross-strip anode of a position resolved measurement apparatus of the state of the art.
Figure 5A:
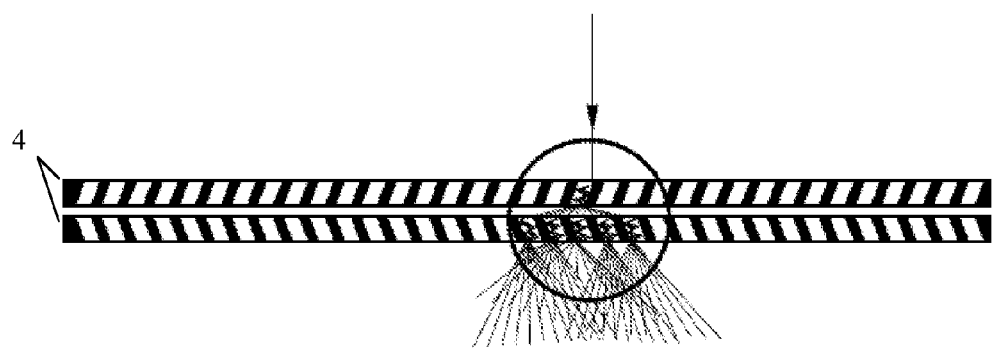
FIG. 5 demonstrates the operation principle of a microchannel plate of the state of the art.
Figure 5B:
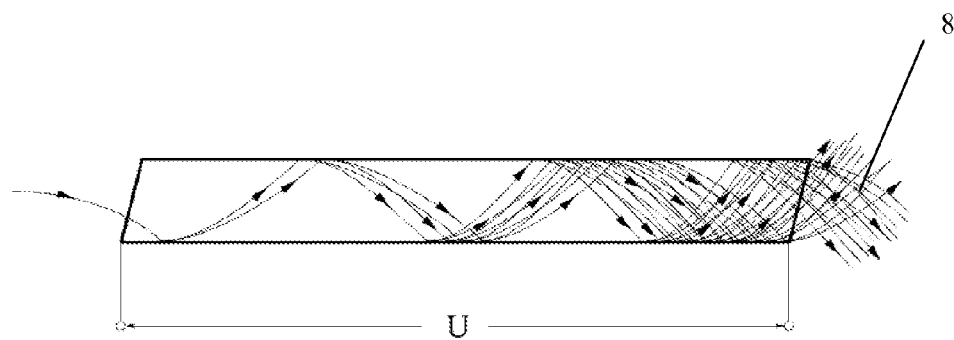
Figure 6:
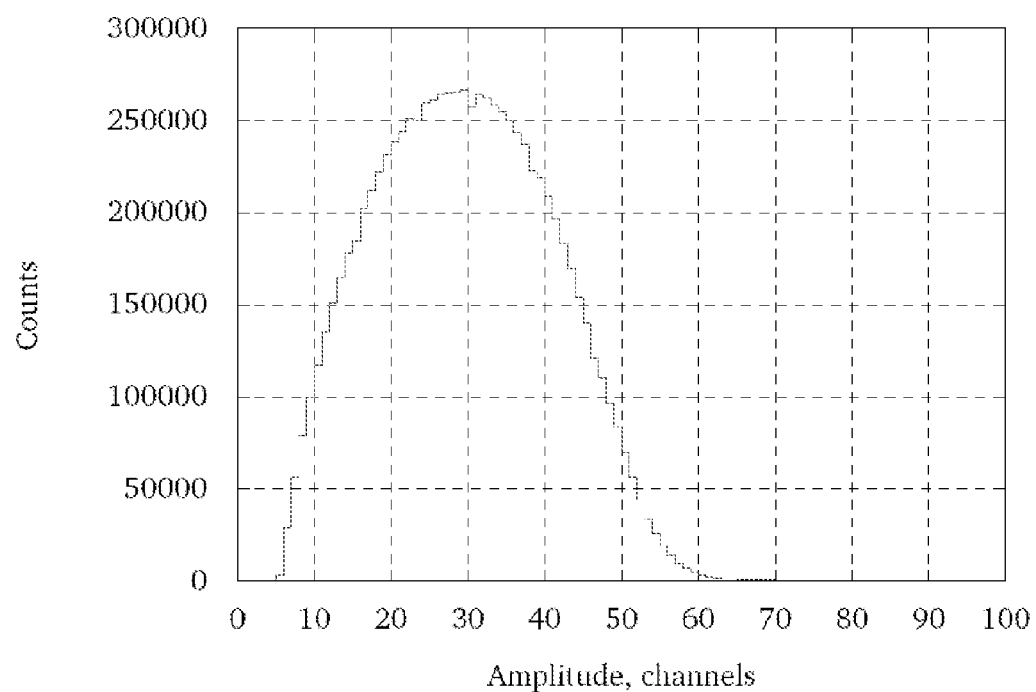
FIG. 6 shows an amplitude distribution for an MCP assembly with two MCPs.
Figure 7:
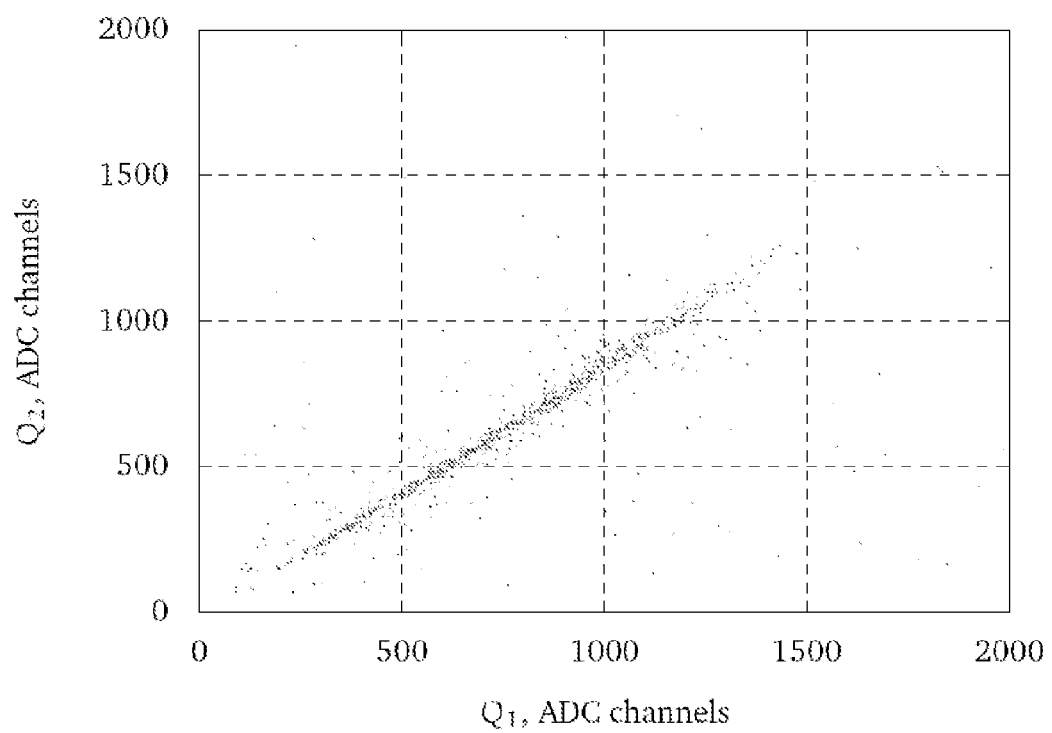
FIG. 7 shows a plot of two measured charges for quadrants 1 and 2 in FIG. 2 for a single excitation point.
Figure 16:
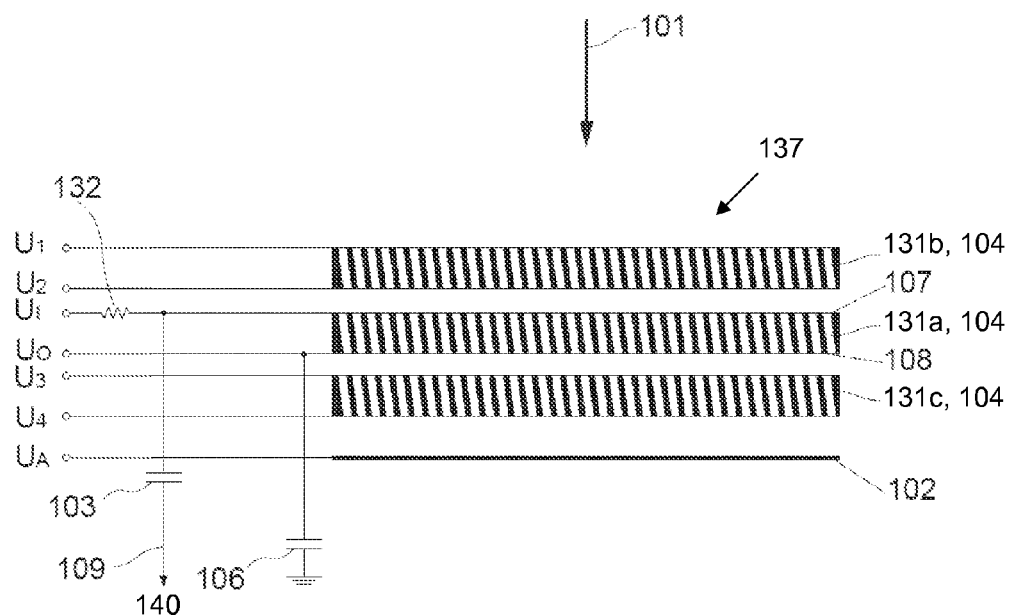
FIG. 16 is a schematic drawing of an additional time resolution, i.e a position and time sensitive detector according to a first embodiment of the invention.
Figure 17:
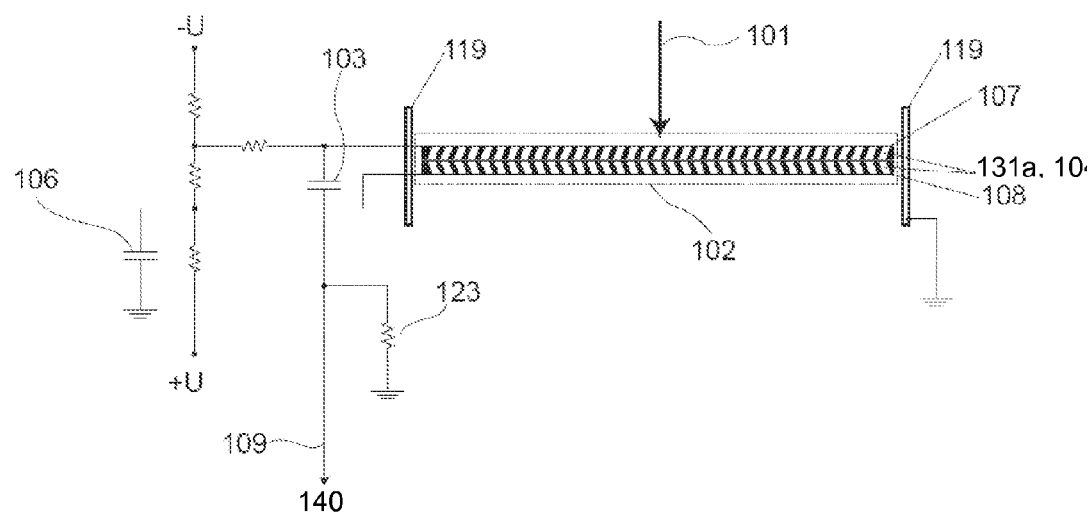
FIG. 17 is a schematic drawing of a position and time sensitive detector according to a second embodiment of the invention.
Figure 20:
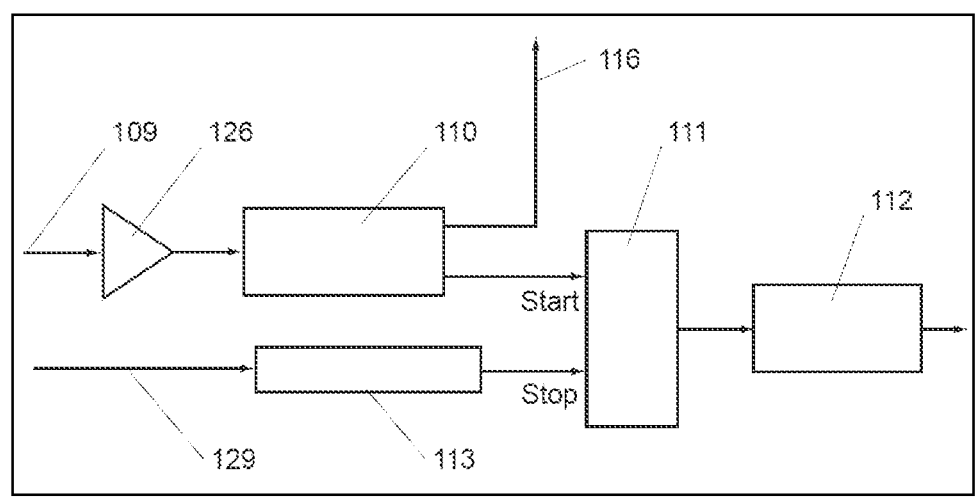
FIG. 20 is a schematic drawing of the inventive time measuring means.
Figure 21:
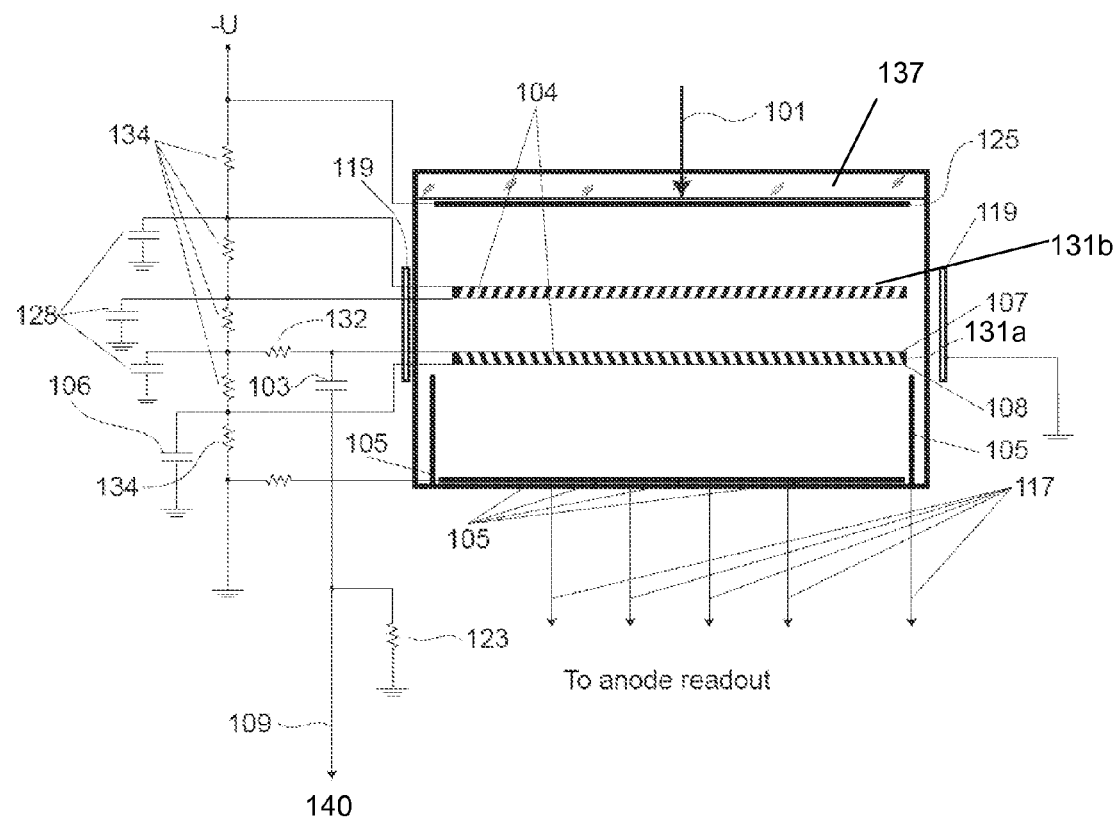
FIG. 21 is a schematic drawing of the position and time-resolved measurement apparatus according to a first embodiment.
Figure 22:
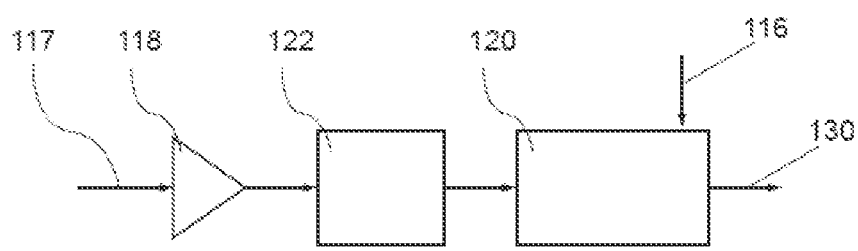
FIG. 22 is a schematic drawing of a charge measuring device used for position measurements.
Figure 23:
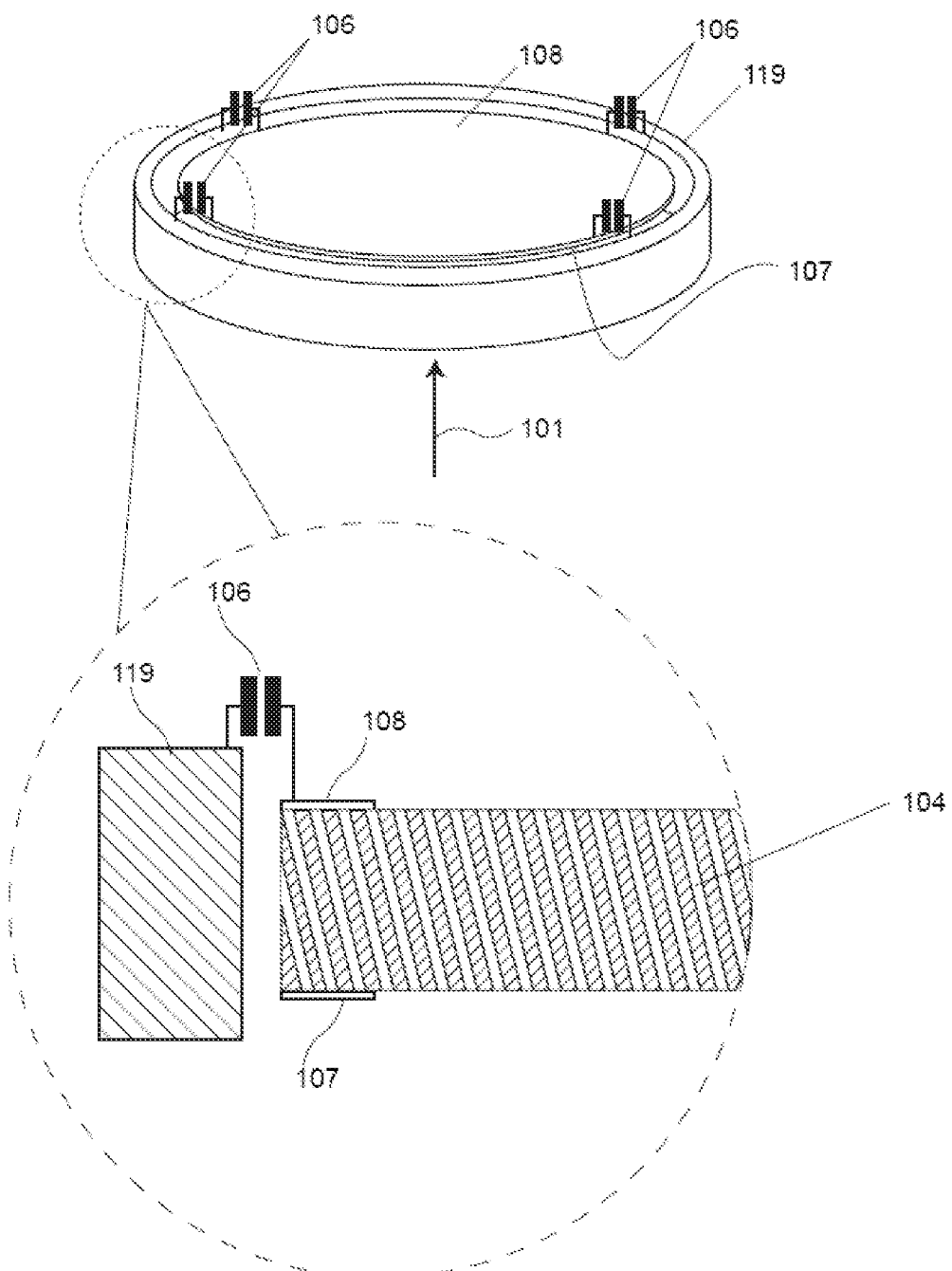
FIG. 23 is a schematic view showing a shielding ring.
Figure 24:
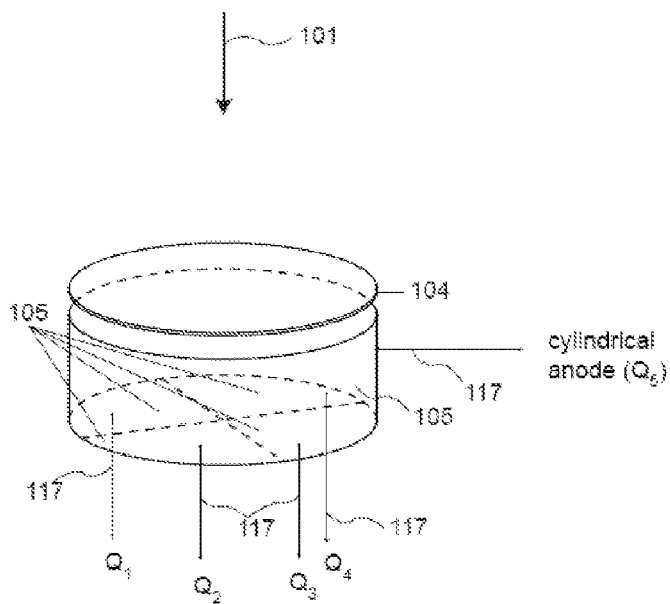
FIG. 24 depicts an extended quadrant anode employed in the first embodiment.
Figure 25:
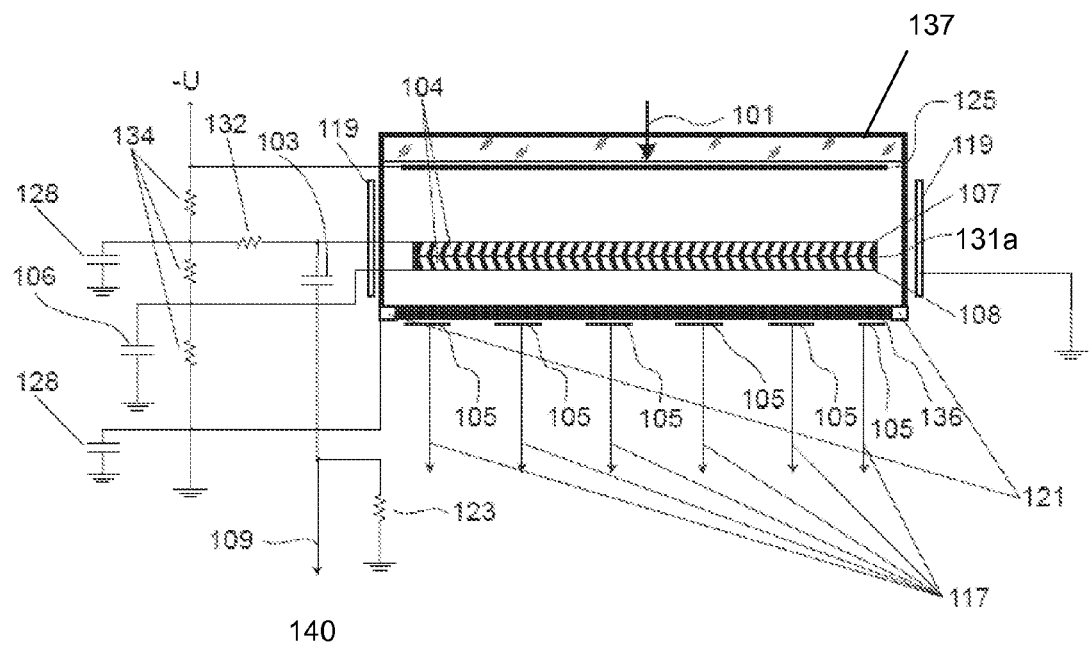
FIG. 25 is a block diagram of the time-resolved measurement apparatus according to a second embodiment of the invention.

FIG. 16 shows a schematic drawing of a time sensitive detector according to a first embodiment of the invention. FIG. 17 displays a detector according to a second embodiment of the invention. FIGS. 3 and 4 depict the employed pulsed irradiation source according to a first embodiment and second embodiment. FIG. 20 is a schematic drawing of the inventive time measuring means 140 used in the embodiments. The time-resolved measurement apparatus according to a first embodiment is shown in FIG. 21. FIG. 22 is a schematic drawing of a charge measuring device optionally used for position measurements in the embodiments. FIG. 23 shows a shielding ring around the detector elements. FIG. 24 depicts an extended quadrant anode employed for position measurements of the incoming electron beam. FIG. 25 is a block diagram of the time-resolved measurement apparatus according to a second embodiment of the invention.

Figure 2:
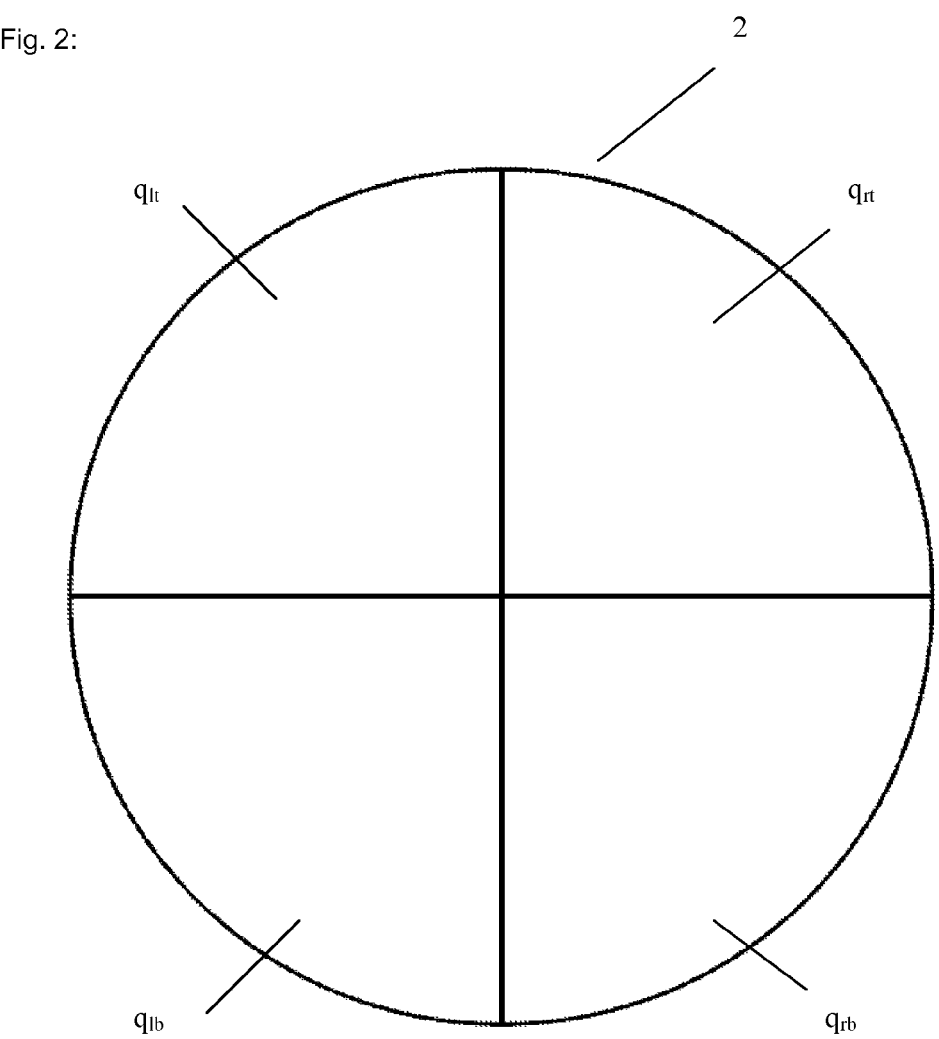
FIG. 2 shows a quadrant anode of a position resolved measurement apparatus of the state of the art.

A preferred time resolved measurement apparatus for acquiring timing information of a quantum beam comprises: a pulsed irradiation source 114 for generating the quantum beam 101 to be measured, a reference signal generator 115 for generating a reference timing pulse being synchronous to the excitation of the irradiation source 114. Thus, the pulsed irradiation source generates reference electrical pulse signals synchronously with the release of irradiation onto the apparatus. The apparatus further comprises a time sensitive detector for detecting irradiation emitted by the source or reemitted by a sample (here, the sample 124 is the source of irradiation converting initial irradiation 133 into 101 fed into the apparatus) as a response to an initial irradiation as shown in FIGS. 1 and 2. The detector generates a timing pulse synchronously with the detection and generates anode signals, preferably but not limiting depending on a position of an incident irradiation. A data processor is further provided for storing the time difference between the reference timing pulse and the detection timing pulse generated by the detector. The data processor stores preferably the position of an incident particle along with the measured time difference values.

A first embodiment of the detector is shown in FIG. 16, a second embodiment is shown in FIG. 17. In the figures, the time sensitive detector comprises a detector input face 137 for transmitting a quantum beam 101 incident onto the detector, i.e. the side of the detector where the beam 101 enters the detector, in FIG. 16 the upper side, and an anode 102. Between the detector input face 137 and the anode 102 in FIG. 16, three spaced apart electron multiplication cascades 131 are provided, each electron multiplication cascade 131 comprising a single electron multiplication device 104. One of the electron multiplication cascades, the multiplication cascade 131a is used for timing, in FIG. 16 the electron multiplication cascade 131a in the middle. This electron multiplication cascade is referred to the "first electron multiplication cascade 131a" throughout the following. It may also be referred to the "timing signal providing electron multiplication cascade" interchangeably. The numeral "first" does not have any reference to the placement of the electron multiplication cascade 131a with respect to other electron multiplication cascades 131 and the direction of the incident quantum beam as shown by the arrow in FIG. 16. In fact, in FIG. 16 a second electron multiplication cascade 131b is provided on top of the first electron multiplication cascade 131a, i.e. between the first electron multiplication cascade 131a and the detector input face 137, and a third electron multiplication cascade 131c is provided below the first electron multiplication cascade 131a, i.e. between the first electron multiplication cascade 131a and the anode 102.

Each electron multiplication cascade 131 may comprise more than one electron multiplication device 104 placed directly on top of each other in a stack. A stack according to the invention may comprise more than one electron multiplication device stacked directly on top of each other or only a single electron multiplication device. Each cascade is separated by a void to a neighbouring cascade. In other words, while a cascade comprises electron multiplication devices placed directly on top of each other, a plurality of cascades are spaced apart from each other. For instance, FIG. 17 shows a detector with a single electron multiplication cascade 131a comprising two electron multiplication devices 104.

Each electron multiplication cascade 131 and each electron multiplication device 104 are each provided with an input face and an output face. Each electron multiplication cascade 131 is adapted to multiply a quantum beam incident on its input face. This quantum beam may be the quantum beam 101 incident on the detector or the output of a previous electron multiplication cascade 131. In FIG. 16, the quantum beam 101 incident on the detector is incident on the input face of the second electron multiplication cascade 131b, in FIG. 16 the topmost one. The output beam of the second electron multiplication cascade 131b is incident on the input face the first electron multiplication cascade 131a. The beam being emitted from the output face of the first electron multiplication cascade 131a is incident on the input face of the third electron multiplication cascade 131c. The output of the third electron multiplication cascade 131c is directed to the anode 102. Since each electron multiplication cascade 131 in FIG. 16 comprises only a single electron multiplication device 104, each input face of an electron multiplication cascade 131 is also the input face of its corresponding electron multiplication device 104 and each output face of an electron multiplication cascade 131 is also the output face of its corresponding electron multiplication device 104.

In order to provide a timing pulse, a means for measuring a detection timing pulse 140 is provided being connected to an input face 107 of one of the at least one electron multiplication devices 104 of the first electron multiplication cascade 131a. An output face 108 of one of the at least one electron multiplication devices 104 of the first electron multiplication cascade 131a is connected to a ground potential, wherein said output face 108 is arranged between said input face 107 connected to the means for measuring a detection timing pulse 140 and the anode 102. In other words, the grounded output face 108 is placed with respect to the direction of the incident beam behind the input face 107 used for timing and the anode 102. Since in FIG. 16, each electron multiplication cascade 131 consists of only a single electron multiplication device 104, the input face 107 of that single electron multiplication device 104 of the first electron multiplication cascade 131a (in FIG. 16 the middle one) is used to output a timing signal and the output face 108 of that electron multiplication device 104 is grounded.

In other words, in direction of the incident particle 101 as indicated in FIG. 16, the detector comprises an input face 137, then a second multiplication cascade 131b followed by a spaced apart first electron multiplication cascade 131a followed by a spaced apart third electron multiplication cascade 131c. An anode 102 is finally provided facing the output face of the third electron multiplication cascade 131c.

Figure 18:
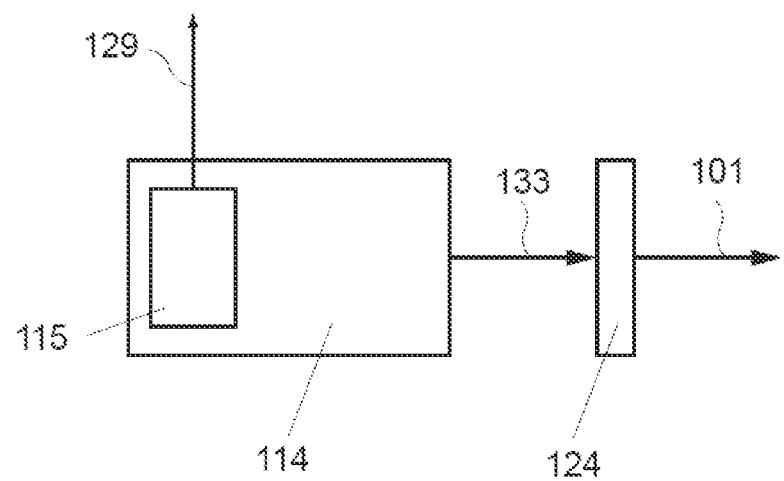
FIG. 18 depicts employed pulsed irradiation source according to a first embodiment.

The input surface 107 used for timing is connected to a high-voltage supplier via a current limiting resistor 132. A decoupling capacitor 103 is used to decouple the high-voltage part of the detector from associated low-voltage time measurement electronics. One electrode of the capacitor 103 is connected to a point between said input surface 107 of the multiplication cascade 131a used for timing and the current limiting resistor 132. The second electrode of the decoupling capacitor 103 is connected to the line 109 that feeds the timing signal to the connected time-interval measuring device as shown in FIG. 18. The output surface 108 of the multiplication device 104 used for timing is connected to ground through one or more high-frequency capacitors 106.

The high voltage supplier is provided to establish a potential gradient along the path of the quantum beam such that the quantum beam is accelerated along its path, i.e. a potential gradient is formed between the detector input face 137 and the anode 102. In FIG. 16, the high voltage supplier provides the input face and the output face of each electron multiplication cascade 131 with a different voltage. A high voltage $U_I$ is applied to the input surface 107 of the multiplication device 104 used for timing through the current limiting resistor 132. A voltage $U_O$ is applied to the output surface 108 of the cascade 131a used for timing forming the voltage difference such as $U_I < U_O$. The voltage difference depending on a number and type of the MCPs forming cascade shall be high enough to enable a stack multiplication operation. A voltage is applied to every input and every output of the multiplication cascades 131 forming a gradient of the field through the whole detector starting from the most negative at the first point to the most positive at the anode system 102 allowing an electron avalanche to be propagated along the direction of irradiation.

An incident particle 101 interacting with the first MCP 104 with respect to the direction of the irradiation results in an avalanche of electrons. Following an applied electrical field, the avalanche passes through the provided multiplication cascades 131 gaining more and more electrons. The resulting electrical impulse propagates over the respective MCP 104 and the power supplier compensates the lack of electrons. The current pulse formed by the current limiting resistor 132 charges the capacitor 103. The resulting signal 109 is fed into the time means for measuring a detection timing pulse as shown in FIG. 20. The electron avalanche propagates further until it reaches the anode 102.

It is known from prior art that an MCP 104 is sensitive to a wide range of irradiation types including high-energy gamma quanta, electrons, neutrons, alpha particles and ions. The MCP 104 cannot be used for direct registration of the low energy photons. Therefore, in order to register the light in a visible range, a photocathode 125 may be additionally used to convert quanta of visible light into the photoelectron. The spectral sensitivity depends on the photocathode type: bialkali photocathode features high quantum efficiency in the range of 400-500 nm; multialkali is sensitive in the red area of the spectrum (up to 850 nm); a large family of AsGa photocathodes depending on the processing type cover a wide range of wavelengths from ultra-violet to infra-red. An MCP 104 can directly amplify this photoelectron and cause an avalanche.

The role of the grounding capacitors 106 is to make the output surface 108 of the multiplication cascade equipotential in order to eliminate the dependence of the shape and amplitude of the resulting timing pulse from the position on the MCP where the multiplication takes place. A distributed chain of resistors and capacitors may model an MCP 104. The electron avalanche induced by an incident particle is a breakthrough of one of the capacitors. The electromagnetic wave is spreading from the point of the electron avalanche born point along the surface of the MCP. Interacting with the edges of the plate, the wave gets reflected and travels back away from the perimeter over a conductive layer of the MCP surface. The amplitude of the wave on the output surface is higher than on the input surface due to the direction of the avalanche development. Therefore, to avoid multiple reflections one has to provide the freedom for the wave to leave the output surface of the MCP. The present invention uses a set of one or more capacitors 106 to do so. The charge held by the capacitors 106 is the source of charge to compensate the wave. Therefore it will not be reflected, but the development of further reflection will end on the edge. In other words the capacitors 106 have a zero resistivity for the pulse signal and can compensate and smoothen the signal in the same manner as they act as a filtering capacitor to filter the noise in a power supplier design.

However, the output surface 108 of the multiplication cascade can also be directly connected to the ground eliminating the need in grounding capacitors 106. In this case the voltage UI is negative relative to the ground level and all the voltages applied after this point are positive.

The grounding shall feature a high conductivity due to the extremely fast nature of the signals provided by the MCP 104. As it is known from prior art, current flows mainly on the surface of the conductor due to the skin effect. Therefore, a high conductive metal like silver or gold may cover the grounding electrode. Electrically, the ground electrode can be treated as an infinite capacity that will keep its potential constant in time independently from the influence of the electrical pulses coming in. The great benefit is that such configuration damps the reflections of the high frequency electro-magnetic wave induced by emitting the electron avalanche. Furthermore, the timing pulse taken from an output surface of an MCP as in US 2007/0263223 A1 includes a component of positive and negative polarity. In contrast to this approach, the present invention results in a positive only signal eliminating the need of employing zero crossing techniques for ultra short pulses. Therefore, the signal being integrated carries the complete information about the amplitude of the avalanche i.e. the number of electrons emitted by the channel. In contrast, integrating a bipolar signal would not result in a signal proportional to the amplitude of the avalanche. In a single particle counting mode the particles are registered sequentially. Therefore it is possible to measure positions along with timing for every single particle registered by the detector in contrast to the integrating measuring methods. Accordingly, the intensity of an incident particle beam may be low enough to result mainly in single particle events. Another aspect of making the surface equipotential is shielding the surface 107 where the timing signal is taken from the influence of the processes taking place while the avalanche propagates further through the amplification cascades. Therefore, the acquired time signal will not be contaminated by electronic noise that may appear during development of the avalanche inside the amplification cascades 131 situated further downstream with respect to the direction of irradiation or during an avalanche-anode interaction.

FIG. 17 shows a second embodiment of the inventive detector. Only a single electron multiplication cascade 131*a* is provided consisting of two electron multiplication devices 104 arranged in a stack, i.e. stacked directly on top of each other. The input face 107 of the topmost electron multiplication device 104 in FIG. 17, i.e. the one on which the quantum beam 101 is incident on, is used for timing. The input face 107 is connected to the time measuring means via capacitor 103 and line 109, as in FIG. 16. The output face 108 of the second electron multiplication device 131 of the first electron multiplication cascade 131*a* is grounded via capacitor 106, as described in the first embodiment. A potential gradient from a voltage of −U to +U is established between said input face 107 and said output face 108. An anode 102 is provided facing the output face 108 of the electron multiplication cascade 131*a*. Furthermore, optionally a surrounding shielding ring 119 may be provided surrounding the electron multiplication cascade. The surrounding shielding ring 119 will be discussed later. The ring 119 is connected to ground as shown in FIG. 17.

The pulsed irradiation device of a first embodiment as shown in FIG. 18 comprises an irradiation source 114 emitting short pulses of irradiation 133, a reference signal generator 115 providing electrical pulses 129 synchronous with the irradiation emission of the irradiation source 114 and a sample 124 reemitting or converting an initial irradiation into other form of irradiation 101. The irradiation source 114 emits a short pulse of the irradiation. The electrical pulses of the reference signal generator 115 can drive the emission of the irradiation. Or the portion of irradiation beam 133 is used to produce the reference signals as shown in a second embodiment in FIG. 19. Here, the irradiation 133 interacts with the sample 124. The sample acts as a converter of the initial irradiation particles 133 to the particles 101 that are fed into the detector. The sample 124 may act as a transporter of the initial irradiation 133 into the beam 101 fed into the detector. Of course, also a sample 124 could be optional and a quantum beam may directly enter the detector.

Figure 19:
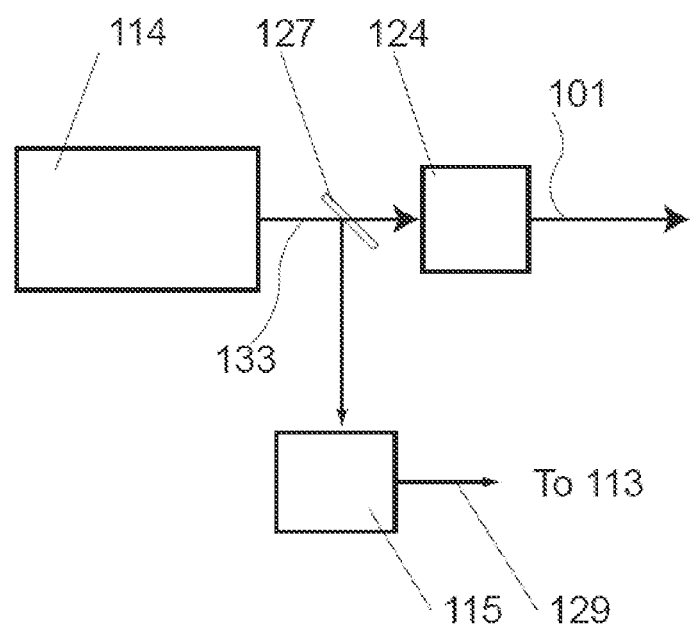
FIG. 19 depicts the employed pulsed irradiation source according to a second embodiment.

In a time correlated single photon counting (TCSPC) or time and space correlated single photon counting (TSCSPC) approach as for instance to determine Foersters resonance energy transfer (FRET) by analyzing fluorescence lifetimes of donor and/or acceptor, a pulsed irradiation source 114 emits a beam of particles or photons fed into the sample 124 that reemits the beam 101 or directly to the detector in a pulsed manner. A particle accelerator is one of possible implementations of such source. Emitting a beam of particles, the trigger reference signal 129 is generated by the reference signal generator 115 triggering the release of the particle beam from the accelerator. A pulsed diode laser is another example of the irradiation source 114 that can be triggered by an external reference signal source or may generate it internally. As it is known from prior art, in order to employ mode locked pulse lasers, one has to take a small portion of the total beam intensity and trigger a photodiode 115 acting here as a reference signal generator in order to generate the reference signal 129 (FIG. 19).

The means for measuring a detection timing pulse 140 as shown in FIG. 20 is provided with two electrical inputs 109 and 129 and comprises a high frequency signal amplifier 126; a discriminator 110; a delay line 113 and interval-measuring device. An interval-measuring device may comprise a time to amplitude converter (TAC) 111 and analog to digital converter 112 or may be realized as a time interval measuring device with a direct coding device featuring direct conversion of the time interval into the digital code.

The timing signal from the detector, i.e. from the input face 107 used for timing in FIGS. 1 and 2, is fed to the high frequency amplifier 126 over line 109. The amplified signal passes thought the discriminator 110 and, if the amplitude of the signal is high enough, pulses of a standard amplitude and duration are generated. The discriminator can be a simple constant threshold discriminator or a constant fraction discriminator (CFD) compensating a time jitter induced by the amplitude resolution of the MCP based multiplication cascade. At the output of the discriminator, two signals are generated. The first one is a signal 116 used to trigger a position sensitive anode readout system (as shown in FIG. 22) or other equipment depending on the application. The position sensitive anode readout system is then connected to an artificial neural network as described previously with reference to FIG. 1-15.

The second signal is fed to the "Start" input of TAC 111. The reference signal 129 generated by the reference signal generator 115 is fed to the delay line 113. The length of the delay is set to cover the time interval window of the interval-measuring device. If the amplitude of the avalanche is higher than a predefined threshold, then the signal passes the discriminator 110. In contrast, the reference signal 129 generated by the reference signal generator 115 is usually meant to be periodical and fed to the "Stop" input for each generated irradiation pulse. The output of the TAC 111 is fed into analog-to-digital converter (ADC) 112 that digitizes the signal and passes the resulting digital signal to the acquisition apparatus for analysis and storage. TAC 111 normally triggers the time ADC 112 while being synchronous to the detector time pulse. The interval measuring device may feature direct time-to-code conversion eliminating the need of analog-to-digital converter 112 providing digital information to be stored and analyzed by acquisition apparatus.

The high frequency pulse amplifier 126 is an optional element and depends on the amplitude of the resulting signal provided by the multiplication cascade 131a where the timing signal is taken. Amplification factors above $10^9$ electrons per avalanche eliminate the need of the amplifier 126 and can be directly fed into discriminator 110. On the other hand, lower amplification of the MCP stack 131 requires a higher amplification coefficient of the amplifier 126. In practice, a noise-to-signal ratio has to be taken into account during the design of the time measuring pipeline. Therefore, an optimal combination of the MCP 104 and an electrical amplification shall be found resulting in minimal noise for the signal amplitude. Indeed, a single multiplication cascade 131 of one MCP 104 may be used for time measuring. However, the threshold of the discriminator 110 shall be set high enough to avoid MCP noise signals related to spontaneous emitting of electrons by the MCP 104 itself. For instance, curved micro-channel plates 104 are known to have a very high amplification in comparison to straight channel MCP's 104. Therefore, it is possible to employ such curved multiplication devices 104 without assembling a stack of plates 104.

An MCP 104 is not an ideal current source and the amplifier 126 does not have constant input resistance over the whole range of input frequencies. Therefore, the signal 109 being transported over the line from the MCP input surface 107 to the input of amplifier 129 suffers from the distortions. The distortions are the result of many reflections of the signal between the point of the signal source on MCP and the input of the amplifier. There are several solutions to solve this problem. In order to achieve maximum amplitude of the timing signals and eliminate reflections one may connect the input of the amplifier 129 directly to the output from the input surface 107 used for timing of the MCP making the line 109 as short as possible.

Another solution disclosed here is to regulate a compensating resistor 123, connected to the line 109 as shown in FIG. 17. In case of a model situation of infinite resistance of an MCP, the resistor 123 value equals the input resistance of amplifier 129 to eliminate any reflections in the cable of line 109. In non-ideal conditions, one has to compensate a non-infinite resistance of the MCP and the non-linearity of the input resistance of the amplifier 129 by choosing the value of resistor 123 such that the resulting signal is not contaminated by the reflected components.

In case the front electron multiplication cascade 131b being closest to the incident quantum beam comprises a single MCP plate only, as shown in FIG. 21, and thus may not be able to provide a required amplitude for the means for measuring a detection timing pulse 140, the timing signal is preferably taken from the further electron multiplication cascade 131a comprising one or more MCP's 104. The signal on the input surface 107 of a single straight channel MCP 104 with only one incident particle may result in an avalanche of $10^3$-$10^4$ electrons in a single channel and thus may be too weak for the timing measurement. In this case, it is preferred to use a further multiplication cascade 131a as the source of timing signal where the avalanche amplitude varies in range of $10^6$-$10^7$ electrons. The further electron multiplication cascade 131a would be an electron multiplication cascade 131 arranged behind the front electron multiplication cascade 131b with respect to the direction of incidence of the incoming quantum beam 101.

The timing signal taken from an output surface of a MCP as described in prior art suffers from the influence of the potential of the anode system 102. Indeed, the potential variation between the output MCP surface 108 and the anode system 102 comprising one or more electrodes 105 will result in a different shape of the avalanche and, as result, will influence the shape of the timing signal taken from the output surface 108 of the MCP. Therefore, grounding the output surface 108 decouples the input surface 107 from the processes taking place outside the MCP.

Furthermore, grounding the output surface 108 of the multiplication cascade 131a eliminates the influence of the voltage between the anode system 102 and the MCP output surface 108. As a consequence, time-resolved measurements become more reliable and stable.

In addition, the result of the integration of the timing signal will be proportional to the amplitude of the avalanche. This fact allows one to compensate the amplitude jitter by software in contrast to a constant-fraction discriminator.

All the measurements result in a signal being positive only, in contrast to the methods where the timing signal is acquired from an output surface 108 of an MCP as known in the art.

The signal does not change the sign and has no post-pulse oscillations resulting in more accurate and precise time signal measurements.

A first embodiment of the inventive time-resolved measurement apparatus will now be described with reference to FIG. 21. The apparatus may comprise a pulsed laser source; a vacuum-sealed photomultiplier tube with a charge-division position sensitive anode 102 as a detector; and means for measuring charge amplitudes of the electrodes of the anode system. However, in general a time resolved measurement apparatus for acquiring a timing information of a quantum beam comprises a pulsed irradiation source 114 for generating the quantum beam; a reference signal generator 115 for generating a reference timing pulse being synchronous to the excitation of the irradiation source 114; a detector as described above, and a data processor for storing the time difference between reference timing pulse and the detection timing pulse generated by said detector. The apparatus in the first embodiment has two amplification cascades 131 each of them being realized as a single microchannel plate 104.

The photomultiplier tube of FIG. 21 is a vacuum-sealed device comprising an input window with the photocathode layer 125 situated in the front of the device with respect to the direction of the irradiation. The cylindrical vacuum volume made of glass houses two multiplication cascades 131 with one MCP each 104. The topmost MCP 104 and electron multiplication cascade 131b faces through its input surface the photocathode 125 and its output surface faces the input surface of the following MCP 104 of the first electron multiplication cascade 131a. The space between the separated electron multiplication cascades 131 is in the range of a few millimeters, here it equals to 4 millimeters. The further MCP 104 used for timing, i.e. the first electron multiplication cascade 131a faces with its input surface 107 the output surface of the topmost MCP 104 and its output surface faces the position sensitive anode 102 or anode system.

A high-voltage power is provided by an external source with one negative output. A voltage divider is used to provide individual voltage values in five points of the detector: the photocathode 125, the input surface of the topmost electron multiplication cascade 131b or topmost MCP 104, the output surface of said topmost MCP 104, the input surface of the further MCP 104 of the first electron multiplication cascade 131a used for timing, and the output surface of said further MCP 104. The anode potential is ground. Thus, a voltage divider comprising a chain of five dividing resistors 134 is used. The current is defined by the sum of all the resistors 134 in the chain. Every surface of the electron multiplication cascades 131 except the last surface has one output through the walls of the detector housing. These outputs are connected to the points of the high voltage divider providing the voltage gradient between the detector elements. The lowest potential of −3000 volts connected directly to the vacuum output of the photocathode 125. Every point of the divider has a supporting filtering capacitor 128 in order to provide stable operation of the detector in a pulsed mode and to filter the noise of the power supplier. The capacitors 128 are holding the charge that is used for purposes of voltage filtering providing a stable voltage and thus smoothing the noise of the high-voltage HV supplier. The timing signal takeout point is the input surface 107 of the first electron amplification cascade 131a, being arranged in FIG. 21 as a second cascade 131 with respect to the direction of the incident quantum beam 101. A current limiting resistor 132 is connected sequentially in the connection from the voltage divider to the input surface 107 of MCP 104. A decoupling capacitor 103 is connected between the current limiting resistor 132 and the input surface 107 of MCP 104. In order to compensate the reflections in the cable 109 to the means for measuring a detection timing pulse 140, a tuning resistor 123 has been used, connected in a point between the timing signal takeout and the amplifier 126 to the ground.

The anode system 102 is a position-sensitive anode 102 comprising five electrically isolated electrodes 105 as shown in FIG. 24. More particular, the anode 102 comprises four planar equally large quadrant electrodes 105 and a fifth cylindrical anode 105. The height of the cylindrical electrode 105 is roughly equal to the radius of the detector. Every electrode 105 has an individual vacuum output 117 through the walls of the detector housing.

An electron avalanche leaving the last MCP with respect to the direction of irradiation carries $10^6$-$10^7$ electrons. Initially the electron cloud near the output surface of the last MCP of the detector (last with respect to the direction of initial incidence of the quantum beam 101) has the diameter of 100-1000 microns depending on a number of active channels covered by the avalanche induced by the photoelectron in the first MCP. Following an applied electrical field, the avalanche travels to the quadrants of the anode 102. At the same time, internal electrical forces induced by the electrons explode the avalanche from inside in all directions. Therefore the avalanche footprint on planar quadrants can be regulated by variation of the voltage applied between the output surface 108 of the last MCP and the anode 102 that has ground potential. An efficient diameter of the footprint is adjusted to be comparable to the size of the quadrant electrode in order to achieve position sensitivity over the whole field of view.

The surrounding fifth electrode collects the charges that traveled aside from the core of avalanche compensating the losses of the avalanche charge on outer edges of the quadrants therefore providing additional information for the position calculation.

The outputs 117 of the anode system are fed into five independent charge-measuring channels as shown in FIG. 22. Every channel comprises a charge sensitive amplifier (CSA) 118, shaping and filtering electronics 122 and ADC 120 featuring synchronization via separate logical input. The signals 117 form the anode electrodes 105 are fed into the input of CSA 118 and converted from the charge (current) signal into the voltage pulse. The loopback capacitance of the CSA 118 defines an integration time and amplification factor of the amplifier. Higher values of the capacitance result in more a precise charge determination and as result higher precision in a definition of the position. The filtering and shaping of the signal is required to be accepted and properly digitized by ADC 120. The output digital signals 130 are fed into acquisition electronics and transferred to an artificial neural network as described previously.

The electrons carried by the avalanche are shared between the electrodes 105 inducing a current pulse in the CSA 118. The amplifier 118 integrates the current pulse and converts it to a voltage signal. Raw signal 117 acquired from the electrode 105 has an exponential shape. The decay time of the exponent and the amplification factor are defined by the value of the loopback capacitor inside the CSA 118. Typical decay time of the anode discharge varies in range of 100-1000 ns. After the amplification, the signal is fed into the filtering device 122 where a step like signal is formed acceptable for digitizing. The synchronization signal 116 is used to trigger ADC 120. This signal is distributed between the charge-measuring channels and guarantees simultaneous generation of the codes representing the charge amplitudes. The output digital signal 103 is fed into means for coordinate computation.

The output surface 108 of said first electron multiplication device used for timing signal acquisition (from the input surface 107) has four electrical outputs from the vacuum volume situated on the perimeter with an angle of about 90° (FIG. 23). The output surface 108 of the electron multiplication device used for timing is connected to a grounded surrounding ring 119 via four high-frequency capacitors 106 on each of the outputs. The surrounding ring is used as a grounding electrode, which brings a number of benefits: (i) due to the cylindrical configuration of the detector it provides a convenient way to mount electrical elements as close as possible to the detector minimizing the dimensions of the detector; (ii) the ring shields the detector assembly from external electromagnetic waves therefore minimizing the noise component in the timing signal.

It is pointed out that the first point of the voltage divider with a filtering capacitor 128 is connected to the front surface of the first MCP 104 while the voltage to the photocathode 125 is provided without any filtering directly from the HV power supplier without internal output filtering. A protection device based on a principle of counting synchronizing pulses 116 is built. In case the number of counts with the certain predefined time interval exceeds a critical value defined by user, a shut-off of the HV supplier occurs. Depending on the distribution of the light on a measured sample, the value can be changed in order to avoid local overexposure of the photocathode 125 and local overheating points of the MCP 104. Indeed, the recommended maxima for the homogeneous illumination of an MCP 104 depending on type and quality of the plate may vary in range of 100 000 to 10 000 000 events per second. Therefore, for homogeneous samples resulting in a uniform illumination of the detector sensitive area, one can set a number of maximum counts in range from 100 to 10 000 per millisecond. For samples with high intensities located in a small spatial area the later values shall be decreased or the integration interval shall be extended in order to avoid the danger of local overheat and overexposure. Putting the filtering capacitor at the point where the photocathode 125 is connected to the voltage divider makes it useless to shut-off the HV power supplier while the voltage will decay exponential like, low discharging all the capacitors 128 through the divider. The HV divider is a chain of high-resistive elements defining a current. A typical value of a single resistor is tens of megaohms. With combination of several farads of capacitors it will result in 10 milliseconds of the discharge time that is fatal for the photocathode under high intensity light exposure. In the configuration of the HV supplying scheme shown on FIG. 21 as described above, the complete disconnecting of the HV supplier occurs within several microseconds after the protecting counter has signaled an overload. Therefore, a high voltage power supplier without internal filtering shall be used.

A mode locked laser is used as an irradiation source 114 in this embodiment (as shown in FIG. 19). A small portion of the emitted light is taken by the beam splitter 127 and fed into the photodiode 115 generating a reference signal 129. The light beam is fed into the fluorescent sample 124 or to the optical system directing the light into the detector. If the fluorescent sample is present the reemitted light 101 is sent to the detector by employing the means to filter an excitation light. The mode-locked lasers operate at a frequency of several megahertz and emit short portions of light in a pulsed manner. The frequency or repetition rate of the laser depends on a mode-locking method, which varies in a wide range from less then 1 hertz up to hundreds of megahertz. The pulse width of current commercially available laser systems varies in range of femtoseconds to nanoseconds.

In present embodiments, a laser running at 8 MHz with 7 ps pulse width has been used. The laser setup is mounted on an optical table allowing precise control of geometrical settings of the setup. A plate of glass of 150 microns thick has been used to reflect a small portion (approximately 4%) of the laser irradiation into the photodiode. The output of the diode is fed into the amplifier and constant fraction discriminator forming a reliable and stable reference signal 113. The rest of the laser power using optical elements such as mirrors, neutrodensity filters, polarization filters, lenses, dichroic mirrors, notch filters and objectives is fed into the sample. The sample 124 reemits the light and the resulting irradiation is fed into the detector. In order to measure the response function of the detector, i.e. achieve the fastest detector response, a mirror is used to direct the light to the photocathode or the sample is exchanged by the fluorophor featuring ultra-fast florescence reemitting times.

An incident photon 101 emitted by a source or reemitted by a sample hits an initial photoelectron out of the surface of the photocathode 125. Following the applied electric fields driven by the HV divider, the photoelectron is accelerated and amplified by the MCP. The resulting initial avalanche carrying $10^3$-$10^4$ electrons falls to the input surface 107 of the following MCP. The voltage in the gap between the output surface of the front MCP and the input surface 107 of the following MCP is regulated to cover approximately at around 100 channels on the input surface of the following MCP. Applying a higher voltage in the gap results in a smaller avalanche footprint and therefore smaller multiplication factor. On the other hand, a lower voltage results in a spreading of the initial avalanche over the input surface 107 of the following MCP used for timing and a higher amplification can be achieved. It is practical for optimal detector operation to set the voltage such that about 100 channels of the following MCP used for timing is covered. As a result, the total amplification factor of the whole stack will be in the range of $10^6$-$10^7$ electrons. The avalanche being escalated in channels of the following MCP 104 used for timing takeout results in a current timing impulse that is acquired by the method of present invention. An electromagnetic wave spreads around the area of the initial avalanche footprint and propagates to the edges of the MCP. Typical travel time of the wave from the center of the MCP to the point of the timing signal readout is in range of 100-200 ps. In the moment when the disturbance due to the avalanche reaches the point of the signal takeout, two concurrent processes are started. The first one is a discharge of the decoupling capacitor 103 that results in a timing signal. The second one is a discharge of the surrounding capacitors 106 to compensate the loss of the electrons in the area where the avalanche went out. These two processes starting in the same moment with the difference of several picoseconds compensate the negative component in the timing pulse.

The resulting avalanche falls to the position sensitive anode 102 comprising four planar and one cylindrical electrode 105 (FIG. 9). Each electrode 105 is connected to the independent processing pipeline (FIG. 22) driven by the synchronizing signal 116 (see FIG. 20). The results of the charge measurements are fed to the acquisition device for processing. Measured charges are used to calculate the position of an incident particle. The digitized value from representing a time interval is stored for every single event. As a result, the complete information about an incident photon is acquired: position provided by anode, time measured by means of TAC and absolute arrival time of every single photon utilizing timer implemented by the acquisition device.

Due to the limited amplitude of the avalanche provided by the MCP 104 being closest to the initial quantum beam, the second MCP 104 is used as a source of the timing signal in this embodiment. Photoelectrons being hit out from the surface of the photocathode 125 follow an applied electrical field travel to the input surface of the multiplication cascade. The time of flight of the photoelectron depends on a number of factors: electron level of the initial electron in the photocathode 125; angle of the ejection; voltage between the photocathode 125 and the input surface of the topmost MCP 104. The time required for the avalanche development inside the MCP 104 is another factor resulting in time jitter of the measured timing signal. Therefore, it is preferable to take the signal from the topmost multiplication cascade 131 with respect to the direction of irradiation due to the smaller time jitter of the travel time of the electron avalanche. In the present embodiment, since the topmost multiplication cascade comprises only a single straight MCP 104, the signal is taken from a second cascade 131*a* in order to provide a sufficient timing signal.

One of the aspects of the present invention results in a smooth dependence of the amplitude of the resulting time signal from the amplitude of the avalanche. The space sensitive anode 102 relies on a principle of the avalanche charge acquisition. Therefore it is possible to employ a fast and simple discriminator 110 in a time processing pipeline (FIG. 20) instead of CFD leaving the time jitter correction to the processing device and simplifying the electronic module.

Another aspect of the late software correction results in a better smoothing comparing to the hardware CFD method. Indeed, a correction using a computer relies on a shifting of the values of time to a certain distance that can be written as following: TR=T0−F(A), where TR is a corrected value of the time, T0 is a measured by TAC raw value distorted by the threshold jitter, A is the sum of all the measured charges and F(A) is a correcting function. Experimentally it has been found that function F(A) is better fitted by the sum of the negative exponents of the amplitude or even better by an artificial neural network.

Another correction applied having a goal to correct the time jitter resulting by the travel time of the signal across the surface of the MCP from the avalanche born area to the point of the signal takeout.

The second embodiment as displayed in FIG. 25 demonstrates another aspect of the present invention. The major difference to the first embodiment of FIG. 17 is that the signal is taken from the front multiplication cascade 131*a* with respect of the direction of irradiation. Here, the front multiplication cascade 131*a* comprises two electron multiplication devices 104 in contrast to the embodiment of FIG. 21. Thus, here the multiplication cascade used for timing is the front multiplication cascade 131*a*. Furthermore, a position sensitive readout is implemented outside the vacuum volume using a decoupling layer. The inducted charge is measured on the outer surface of the detector. However, this decoupling layer and the connection to the outside is optional and not limiting.

The second embodiment employs a vacuum-sealed MCP based photo-detector comprising the photocathode 125, an MCP chevron 131 with two MCPs 104 on top of each other, where the angle of the channels of the first MCP 104 is opposite to the angle of the channels in the second MCP 104, a high resistive decoupling layer 136, preferably made of Germanium or sapphire, and an external multi-electrode 105 anode 102. The germanium layer 136 is mounted on top of a metal flange 121 that discharges the resistive layer. The output surface 108 of the multiplication cascade 131 is connected to the surrounding high conductive ring 119 by the high-frequency capacitor 106. In this embodiment, the only output is available for grounding the output surface 108 that is used in contrast to the four points in the first embodiment. The point of the timing signal takeout is the input surface 107 of the only multiplication cascade 131*a* present in the detector. A multi-electrode anode system 102 is mounted to the outer surface of germanium layer 136 outside the vacuum volume. The charge is not measured directly by the electrodes 105 situated in vacuum but an induced charging of insulator 136 is registered. The induced charge is the result of the interaction of the charge of the avalanche that falls to the high-resistive layer and matter of the layer 136. The design of the layer 136 follows two requirements: (i) the layer 136 must have a high resistance in order to keep the charge of the avalanche in a local area of the avalanche footprint, and (ii) on other hand, the resistance shall be finite and allow the charge to propagate to the edges and to be discharged via flange 121.

An incident photon 101 emitted by source or reemitted by the sample hits an initial photoelectron out of the surface of the photocathode 125. Following applied electric fields driven by the HV divider, the photoelectron is accelerated and gets amplified by the stack assembly of MCP's 104. The resulting avalanche carrying $10^6$-$10^7$ electrons falls to resistive layer 136. An electrical field of the charge brought by the avalanche induces a charge on the outer surface of the resistive layer 136, which is measured by the set of electrodes 105. The resulting charge signals 107 are fed to the charge measuring means (FIG. 22). The current pulse is taken out from the input surface 107 via decoupling capacitor 103. The resulting timing signal 109 is fed to the means for the time measurement (FIG. 18) as previously described.

The present invention has been described above in detail on the basis of the embodiments and examples thereof. It is, however, noted that the present invention is by no means intended to be limited to the above embodiments. The present invention can be modified in various ways without departing from the scope of the invention.

The invention claimed is:

1. A position resolved measurement apparatus for acquiring a position information of an irradiation position of a quantum beam incident thereon, the apparatus comprising:
    a position sensitive detector (1);
    an irradiation source (6);
    means for measuring the response of detector (1) generated upon irradiation by irradiation source (6);
    wherein
        an artificial neural network structure (7) is provided such that the measured detector response is the input to the artificial neural network structure (7) and the initial space coordinates of irradiation are the output of the artificial neural network structure (7);
        the position sensitive detector (1) comprises an amplification device (4); and a position sensitive anode (2, 102) mounted behind the amplification device (4), with respect to the direction of irradiation,
    wherein
    the amplification device (4) is realized as:
        a first electron multiplication cascade (131*a*) provided between the detector input face (137) and the anode (102), the first electron multiplication cascade (131*a*) comprising at least one electron multiplication device (104) arranged in a stack, the first electron multiplication cascade (131*a*) and the at least one electron multiplication device (104) having each an input face and an output face, the first electron multiplication cascade (131*a*) being adapted to multiply a quantum beam incident on its input face;
    and the detector further comprises:
        a detector input face (137) for transmitting a quantum beam (101) incident onto the detector;

a high voltage supplier providing a potential gradient between the input face and the output face of the first electron multiplication cascade (131a), and means for measuring a detection timing pulse (140) for timing the detection of the quantum beam incident onto the detector;

wherein the means for measuring a detection timing pulse (140) is connected to an input face (107) of one of the at least one electron multiplication devices (104) of the first electron multiplication cascade (131a), and an output face (108) of one of the at least one electron multiplication devices (104) of the first electron multiplication cascade (131a) is connected to a ground potential, said output face (108) being arranged between said input face (107) connected to the means for measuring a detection timing pulse (140) and the anode (102).

2. The position resolved measurement apparatus according to claim 1, wherein the irradiation source (6) is an electromagnetic radiation source or a particle source.

3. The position resolved measurement apparatus according to claim 1, wherein the amplification device (4) comprises an electron multiplication device such as at least one microchannel plate MCP or at least one micro-sphere plate or at least one microgas amplification device.

4. The position resolved measurement apparatus according to claim 1, wherein the position sensitive anode (2) comprises at least two spatially divided electrodes (5).

5. The position resolved measurement apparatus according to claim 1, wherein the position sensitive detector (1) is a time based or charge based detector (1).

6. The position resolved measurement apparatus according to claim 1, wherein a time based position sensitive detector (1) is a delay-line detector or a delay-line related detector and a charge based detector is a graded-density anode detector or a resistive anode detector or an multi-electrode anode detector.

7. The position resolved measurement apparatus according to claim 1, wherein the at least one electron multiplication device (104) of the first electron multiplication cascade (131a) is realized as a microchannel plate or a microsphere plate.

8. The position resolved measurement apparatus according to claim 1, wherein said input face (107), to which the means for measuring a detection timing pulse (140) is connected, and said output face (108) being connected to a ground potential are realized as the input and output faces of a single electron multiplication device (104) of the first electron multiplication cascade (131a).

9. The position resolved measurement apparatus according claim 1, wherein the first electron multiplication cascade (131a) comprises at least two electron multiplication devices (104) arranged in a stack, said input face (107), to which the means for measuring a detection timing pulse (140) is connected, and said output face (108) being connected to a ground potential are realized as the input and output faces of different electron multiplication devices (104) of said first electron multiplication cascade (131a).

10. The position resolved measurement apparatus according to claim 1, wherein at least one second electron multiplication cascade (131b) is provided between the detector input face (137) and the first electron multiplication cascade (131a) and/or at least one third electron multiplication cascade (131c) is provided between the first electron multiplication cascade (131a) and the anode (102).

11. The position resolved measurement apparatus according to claim 1, wherein the output face (108) of one of the at least one electron multiplication devices (104) of the first electron multiplication cascade (131a) is connected to ground potential via a high-frequency capacitor (106).

12. The position resolved measurement apparatus according to claim 1, wherein the number of input nodes of the artificial neural network structure (7) is equal to the number of different spatially divided anode electrodes (5) and the number of output nodes is equal to the number of different spatial coordinates of the initial irradiation point.

13. The position resolved measurement apparatus according to claim 1, wherein the artificial neural network structure (7) is realized as a feed-forward neural network, wherein the transfer function $F(p_i, q)$ of the artificial neural network structure (7) is a nested function of non-linear vector functions f, wherein $p_i$ are the neural network parameters vectors and q is a vector having the detector response with respect to the measured value of the k-th detector output as its elements, and $F(p_i, q_k) = f_1(p_1, f_2( \ldots (f_{n-1}(p_{n-1}, (f_n(p_n, q_k)))$.

14. Method for acquiring a position information of a quantum beam incident onto an position resolved measurement apparatus according to claim 1, comprising:

training the artificial neural network structure (7) to estimate space coordinates of an irradiation position onto the detector (1) by feeding detector responses from known initial irradiation positions as an input into the artificial neural network structure (7) and optimizing the artificial neural network (7) parameters until the artificial neural network structure (7) is able to estimate an initial position of irradiation as an output of the artificial neural network structure (7) with a given accuracy;

irradiating the detector (1) by the irradiation source (6);

measuring the response of detector (1) upon irradiation by irradiation source (6);

inputting the measured detector response as an input into the trained artificial neural network structure (7);

calculating the output of the artificial neural network structure (7) corresponding to an estimate of the spatial coordinates of the initial irradiation, wherein the detector comprises:

a detector input face (137) for transmitting a quantum beam (101) incident onto the detector;

an anode (102);

a first electron multiplication cascade (131a) provided between the detector input face (137) and the anode (102), the first electron multiplication cascade (131a) comprising at least one electron multiplication device (104) arranged in a stack, the first electron multiplication cascade (131a) and the at least one electron multiplication device (104) having each an input face and an output face, the first electron multiplication cascade (131a) being adapted to multiply a quantum beam incident on its input face;

a high voltage supplier providing a potential gradient between the input face and the output face of the first electron multiplication cascade (131a), and means for measuring a detection timing pulse (140) for timing the detection of the quantum beam incident onto the detector;

the method further comprising the stop of acquiring a timing signal by:

connecting the means for measuring a detection timing pulse (140) to an input face (107) of one of the at least one electron multiplication devices (104) of the first electron multiplication cascade (131a), and connecting an output face (108) of one of the at least one electron multiplication devices (104) of the first electron multiplication cascade (131a) to a ground potential, said output face (108) being arranged between said input face (107) connected to the means for measuring a detection timing pulse (140) and the anode (102).

15. Method of claim 14, wherein the training step of the artificial neural network structure (7) in order to estimate the space coordinates of the initial irradiation of detector (1) comprises the following steps:
- i) irradiating the detector (1) from a known spatial coordinate;
- ii) measuring the resultant detector response;
- iii) storing the detector's response and the known spatial coordinates of irradiation;
- iv) repeating the above steps i)-iii) for different spatial coordinates sampling the space of irradiation;
- v) feeding the measured detector responses as an input into the artificial neural network structure (7);
- vi) calculating the resulting output of the artificial neural network structure (7) corresponding to the spatial coordinates of the initial irradiation;
- vii) calculating a function of the difference between the known initial spatial coordinates of irradiation and the present output of the artificial neural network structure (7) representing the spatial coordinates;
- viii) changing the parameters of the artificial neural network structure (7) in order to minimize said function of the difference;
- ix) if the calculated function of the difference is below a given threshold value, stop the training process, otherwise return to step v).

16. Method according to claim 14, wherein the detector's response is related to measured charges in case of a charge-based detector as the position sensitive detector (1) or measured time in case of a time-based detector as the position sensitive detector (1) or measured currents in case of resistive anode detectors as the position sensitive detector (1).

17. Method according to claim 14, wherein the position sensitive detector (1) comprises
- an amplification device (4); and
- a position sensitive anode mounted behind the amplification device (4), with respect to the direction of irradiation.

18. Method according to claim 14, wherein the amplification device (4) comprises an electron multiplication device such as at least one micro-channel plate MCP or at least one micro-sphere plate or at least one microgas amplification device.

19. Method according to claim 14, wherein the position sensitive anode comprises at least two spatially divided electrodes (5).

20. Method according to claim 14, where the response of the detector (1) is a vector having the response with respect to each anode electrode (5) as its elements, and each vector element representing the measured response for an anode electrode (5) is an input to a separate input node of the artificial neural network structure (7).

* * * * *